US011356574B2

(12) United States Patent
Yoshikaie et al.

(10) Patent No.: US 11,356,574 B2
(45) Date of Patent: Jun. 7, 2022

(54) IMAGE READING APPARATUS

(71) Applicant: SEIKO EPSON CORPORATION, Tokyo (JP)

(72) Inventors: Kazuya Yoshikaie, Kitakyushu (JP); Kazuhiko Arimori, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/246,976

(22) Filed: May 3, 2021

(65) Prior Publication Data

US 2021/0258440 A1 Aug. 19, 2021

Related U.S. Application Data

(63) Continuation of application No. 16/735,483, filed on Jan. 6, 2020, now Pat. No. 11,032,440, which is a
(Continued)

(30) Foreign Application Priority Data

Jan. 31, 2017 (JP) ................................ 2017-015148

(51) Int. Cl.
*H04N 1/00* (2006.01)
*G03B 27/32* (2006.01)
(Continued)

(52) U.S. Cl.
CPC .......... *H04N 1/00745* (2013.01); *B65H 7/02* (2013.01); *G03B 27/32* (2013.01); *H04N 1/0066* (2013.01);
(Continued)

(58) Field of Classification Search
CPC .......... B65H 2511/242; B65H 2220/03; B65H 7/06; B65H 7/14; B65H 2511/522;
(Continued)

(56) References Cited

U.S. PATENT DOCUMENTS 5,061,958 A 10/1991 Bunker et al.
5,208,902 A 5/1993 Kumon
(Continued)

FOREIGN PATENT DOCUMENTS

CN 103685838 3/2014
JP H04-093851 8/1992
(Continued)

*Primary Examiner* — Negussie Worku
(74) *Attorney, Agent, or Firm* — Workman Nydegger

(57) ABSTRACT

An image reading apparatus includes a medium mounting portion configured to mount a medium; a feeding means configured to feed a medium from the medium mounting portion; at least one edge guide each configured to regulate a corresponding one of at least one medium width direction edge of the medium having been mounted on the medium mounting portion; a reading means configured to read the medium and disposed on a further downstream side than the at least one edge guide in the medium feeding direction; and at least one medium detection means configured to detect the medium and disposed on a further downstream side than the at least one edge guide in the medium feeding direction and further outside in the medium width direction than at least one edge regulation position for the edge regulation by the at least one edge guide.

17 Claims, 15 Drawing Sheets

Related U.S. Application Data continuation of application No. 15/873,529, filed on Jan. 17, 2018, now Pat. No. 10,567,606.

(51) Int. Cl.
*H04N 1/04* (2006.01)
*B65H 7/02* (2006.01)
*H04N 1/028* (2006.01)

(52) U.S. Cl.
CPC ..... *H04N 1/00588* (2013.01); *H04N 1/00599* (2013.01); *H04N 1/00615* (2013.01); *H04N 1/00663* (2013.01); *H04N 1/00689* (2013.01); *H04N 1/00705* (2013.01); *H04N 1/00718* (2013.01); *H04N 1/00734* (2013.01); *H04N 1/00755* (2013.01); *H04N 1/00774* (2013.01); *H04N 1/00779* (2013.01); *H04N 1/028* (2013.01); *H04N 1/04* (2013.01)

(58) Field of Classification Search
CPC .... B65H 3/063; B65H 7/02; B65H 2513/512; B65H 2220/01; B65H 2220/02; B65H 2301/44324; B65H 2553/414; B65H 2801/39; B65H 5/062; B65H 1/04; B65H 1/06; B65H 2511/51; B65H 2511/52; B65H 2511/521; B65H 2511/524; B65H 2553/30; B65H 2553/46; B65H 2553/82; B65H 2801/06; B65H 3/06; B65H 3/0661; B65H 3/5284; B65H 7/125; B65H 9/101; B65H 9/20; B41J 11/0095; B41J 13/0009; B41J 13/0018; B41J 11/0055; B41J 11/007; B41J 11/008; B41J 11/009; B41J 11/64; B41J 13/0027; B41J 13/025; B41J 15/042; B41J 15/046; B41J 15/048; B41J 15/165; B41J 25/20; G03B 27/32; H04N 1/00588; H04N 1/00599; H04N 1/00615; H04N 1/0066; H04N 1/00663; H04N 1/00689; H04N 1/00705; H04N 1/00718; H04N 1/00734; H04N 1/00745; H04N 1/00755; H04N 1/00774; H04N 1/00779; H04N 1/028; H04N 1/04; H04N 1/00037; H04N 1/00082; H04N 1/00602; H04N 1/047; G03G 15/0189; G03G 15/1605; G03G 15/5058; G03G 2215/0129; G03G 2215/0158; G03G 2215/0161

USPC .......................... 358/498, 513, 514
See application file for complete search history.

(56) References Cited

U.S. PATENT DOCUMENTS

| | | | |
|---|---|---|---|
| 6,330,423 | B1 | 12/2001 | Kitazawa |
| 6,456,801 | B1 | 9/2002 | Sakurai |
| 6,718,071 | B2* | 4/2004 | Yoshida ............... G06K 9/3283 358/1.5 |
| 8,043,016 | B2* | 10/2011 | Kogure .................. B41J 11/008 400/279 |
| 8,508,817 | B2 | 8/2013 | Sato |
| 8,599,450 | B2 | 12/2013 | Kubo et al. |
| 8,774,700 | B2 | 7/2014 | Shikama et al. |
| 9,197,775 | B2* | 11/2015 | Koda ................. H04N 1/00713 |
| 9,674,389 | B2 | 6/2017 | Kanaya |
| 9,926,153 | B2 | 3/2018 | Kubota et al. |
| 9,938,099 | B2 | 4/2018 | Akai et al. |
| 10,567,606 | B2 | 2/2020 | Yoshikaie et al. |
| 10,968,063 | B2* | 4/2021 | Shiota ................... B65H 5/062 |
| 2003/0024792 | A1* | 2/2003 | Yoshida ............... G06K 9/3283 198/401 |
| 2005/0024462 | A1 | 2/2005 | Yoshikaie |
| 2005/0225594 | A1 | 10/2005 | Isono et al. |
| 2008/0130070 | A1 | 6/2008 | Walker et al. |
| 2008/0145123 | A1* | 6/2008 | Kogure .................. B41J 11/007 399/395 |
| 2011/0141504 | A1 | 6/2011 | Utsunomiya |
| 2012/0063791 | A1 | 3/2012 | Iwanaga et al. |
| 2014/0078558 | A1 | 3/2014 | Kanaya |
| 2017/0094086 | A1 | 3/2017 | Nomoto et al. |
| 2017/0111524 | A1 | 4/2017 | Tajima et al. |
| 2017/0253452 | A1 | 9/2017 | Ota et al. |
| 2017/0282609 | A1* | 10/2017 | Yatsunami ............ B65H 5/062 |
| 2018/0198943 | A1* | 7/2018 | Yoshikaie .......... H04N 1/00588 |
| 2018/0220022 | A1* | 8/2018 | Yoshikaie ............. G03B 27/32 |
| 2019/0104228 | A1 | 4/2019 | Arimori et al. |
| 2019/0116284 | A1 | 4/2019 | Yoshikaie et al. |
| 2019/0166280 | A1 | 5/2019 | Nishida et al. |
| 2019/0193967 | A1 | 6/2019 | Shuto et al. |
| 2020/0130972 | A1 | 4/2020 | Miyauchi et al. |
| 2020/0255252 | A1 | 8/2020 | Seki |
| 2020/0344376 | A1* | 10/2020 | Sasaki ...................... B41J 11/58 |

FOREIGN PATENT DOCUMENTS

| | | |
|---|---|---|
| JP | H06-258721 | 9/1994 |
| JP | 2006-165857 | 6/2006 |
| JP | 2008-252385 | 10/2008 |
| TW | 201617279 | 5/2016 |

* cited by examiner

IMAGE READING APPARATUS

This Patent Application is a continuation of U.S. patent application Ser. No. 16/735,483, filed Jan. 6, 2020, which is a continuation of U.S. patent application Ser. No. 15/873,529, filed Jan. 17, 2018 and granted on Feb. 18, 2020 as U.S. Pat. No. 10,567,606, which claims priority to Japanese Patent Application No. 2017-015148, filed Jan. 31, 2017, the entire disclosures of which are expressly incorporated by reference herein.

BACKGROUND

1. Technical Field

The present invention relates to an image reading apparatus.

2. Related Art

Hereinafter, a scanner that is an example of an image reading apparatus will be taken as an example and described. The scanner is sometimes configured to enable automatic feeding and reading of plural sheets of documents, each being an example of a medium, to be performed by mounting a feeding apparatus (ADF (Auto Document Feeder)) for automatically feeding the plural sheets of documents.

In such a feeding apparatus, an oblique movement of a document sometimes occurs, and thus, heretofore, a means for dealing with the oblique movement of a document has been employed. As an example thereof, in JP-A-2006-165857, there is disclosed an image inputting apparatus configured to dispose a plurality of paper detection sensors in parallel to a reading line in a feeding portion; include a means that is capable of detecting a paper movement amount even when a roller slippage has occurred; and determine input start and end positions of an image on the basis of the paper movement amount, the states of the sensors, and the positional relations among the sensors.

In such a feeding apparatus, in general, edge guides for guiding the edges of a document are mounted. The oblique movement of a document being fed is restrained by the edge guides, but, for example, in the case where the medium is such thin paper that is significantly nonelastic, when an edge of the document is brought into contact with one of the edge guides, there may occur a case where the document bends at a contact portion and, as a result, the oblique movement is not restrained. Further, such a problem not only occurs in such nonelastic thin paper, but also is likely to occur in other kinds of paper or due to other factors, such as a setting condition of paper.

Further, when the document is continuously fed while such a state remains as it is, as a result, crease may occur at an edge portion of the document and thereby the document is likely to be damaged.

In the image inputting apparatus disclosed in JP-A-2006-165857, the oblique movement of the document can be detected, but the relation between the size of the document and the edge guides is not considered, and thus, the above problem cannot be resolved.

Further, in a configuration in which an anterior end detection means for detecting the anterior end of a document is disposed on the upstream side of a reading sensor, and the reading of the document is started in response to the detection of the anterior end of the document by the anterior end detection means, when a degree of the oblique movement of the document is significant, there may occur a case where, because of the oblique movement, at the time when the anterior detection means has detected the anterior end of the document, part of the anterior end of the document has already reached the reading sensor. In this case, as a result, part of the document is lacked in the reading of the document.

SUMMARY

An advantage of some aspects of the invention is that an image reading apparatus in which problems due to the oblique movement of a document being fed have been further taken into consideration is provided.

According to a first configuration of an image reading apparatus according to an aspect of the invention, the relevant image reading apparatus includes a medium mounting portion configured to mount a medium; a feeding means configured to feed a medium from the medium mounting portion; at least one edge guide each configured to regulate a corresponding one of at least one medium width direction edge of the medium having been mounted on the medium mounting portion, the medium width direction being a direction intersecting with a medium feeding direction; a reading means configured to read the medium and disposed on the further downstream side than the at least one edge guide in the medium feeding direction; and at least one medium detection means configured to detect the medium and disposed on the further downstream side than the at least one edge guide in the medium feeding direction and further outside in the medium width direction than at least one edge regulation position for the edge regulation by the at least one edge guide.

According to this configuration, the image reading apparatus includes the at least one medium detection means configured to detect the medium and disposed on the further downstream side than the at least one edge guide in the medium feeding direction, and further outside in the medium width direction than the at least one edge regulation position for the edge regulation by the at least one edge guide, and thus, the image reading apparatus is capable of directly detecting the medium having been obliquely moved and having protruded to the outside from one of the at least one edge regulation position, for the edge regulation by the at least one edge guide. With this configuration, the oblique movement of the medium, which, when the feeding of the medium is continued, is likely to cause a damage of an edge of the medium or a lack of an image to be read, is detected with certainty, and consequently, the image reading apparatus in which problems due to the oblique movement of the medium being fed have been further taken into consideration is provided. In the above description, "further outside in the medium width direction than the at least one edge regulation position" means "outside a medium passing region in which the medium is fed and passes without being obliquely moved".

According to a second configuration of the image reading apparatus according to the aspect of the invention, in the first configuration, preferably, the at least one edge guide and the at least one medium detection means are respectively disposed so as to form a pair of edge guides each associated with a corresponding one of both side edges of the medium and a pair of medium detection means each associated with a corresponding one of the both side edges of the medium.

According to this configuration, the at least one edge guide and the at least one medium feeding means are respectively disposed so as to form a pair of edge guides each associated with a corresponding one of both side edges of the medium and a pair of medium detection means each associated with a corresponding one of the both side edges of the medium, and thus, regardless of the direction of the oblique movement of the medium, the detection of the medium having protruded to the outside from one of the at least edge regulation position for the edge regulation by the at least one edge guide is made with certainty.

According to a third configuration of the image reading apparatus according to the aspect of the invention, in the first configuration or the second configuration, preferably, preferably, the at least one edge guide is movable in the medium width direction, and the at least one medium detection means is located further outside than the at least one edge regulation position of the at least one edge guide, the at least one edge regulation position being associated with a maximum size of the medium in the medium width direction.

According to this configuration, the at least one edge guide is movable in the medium width direction, and the at least one medium detection means is located further outside than the at least one edge regulation position of the at least one edge guide, the at least one edge regulation position being associated with a maximum size of the medium in the medium width direction, and thus, for the medium whose size is maximum, that is, for the medium for which, when the medium is continuously fed while being obliquely moved, a damage of an edge of the medium is most likely to be caused, the detection of the medium having protruded to the outside from one of the at least one edge regulation position for the edge regulation by the at least one edge guide is made with certainty, and consequently, the damage of the edge of the medium is eliminated or minimized.

According to a fourth configuration of the image reading apparatus according to the aspect of the invention, in the first configuration, preferably, the at least one edge guide is movable in the medium width direction, and the at least one medium detection means is disposed so as to form a plurality of medium detection means each associated with a corresponding one of a plurality of medium size standards and disposed along a movement direction of the at least one edge guide.

According to this configuration, the at least one edge guide is movable in the medium width direction, and the at least one medium detection means is disposed so as to form a plurality of medium detection means each associated with a corresponding one of a plurality of medium size standards and disposed along a movement direction of the at least one edge guide, and thus, for any medium having a size conforming to one of the plurality of medium size standards, the detection of the medium having protruded to the outside from one of the at least one edge regulation position for the edge regulation by the at least one edge guide is made with certainty.

According to a fifth configuration of the image reading apparatus according to the aspect of the invention, in the first configuration, preferably, the at least one edge guide is movable in the medium width direction, and each of the at least one medium detection means is disposed so as to be movable together with a corresponding one of the at least one edge guide in the medium width direction.

According to this configuration, the at least one edge guide is movable in the medium width direction, and each of the at least one medium detection means is disposed so as to be movable together with a corresponding one of the at least one edge guide in the medium width direction, and thus, for any medium among media having various sizes, the detection of the medium having protruded to the outside from one of the at least one edge regulation position for the edge regulation by the at least one edge guide is made with certainty.

According to a sixth configuration of the image reading apparatus according to the aspect of the invention, in any one of the first to fifth configurations, preferably, the relevant image reading apparatus further includes at least one feeding guide disposed further outside than the at least one edge regulation position in the medium width direction and each configured to regulate a corresponding one of the at least one medium width direction edge of the medium being fed. Further, preferably, at least one notch is each formed in a corresponding one of the at least one feeding guide, and each of the at least one medium detection means is disposed inside a corresponding one of the at least one notch.

According to this configuration, the relevant image reading apparatus further includes at least one feeding guide disposed further outside than the at least one edge regulation position in the medium width direction and each configured to regulate a corresponding one of the at least one medium width direction edge of the medium being fed. Further, at least one notch is each formed in a corresponding one of the at least one feeding guide, and each of the at least one medium detection means is disposed inside a corresponding one of the at least one notch. Thus, for a medium whose rigidity is relatively high, even though an oblique movement of the medium is about to begin, the oblique movement is regulated by one of the at least one feeding guide, and since each of the at least one medium detection means is disposed inside a corresponding one of the at least one notch, the oblique movement is not detected by the at least one medium detection means, and consequently, the feeding of the medium is appropriately continued.

Further, for a medium whose rigidity is low, when an edge of the medium is brought into contact with one of the at least one feeding guide, the edge of the medium is caused to bend at a contact portion, and the posture of the medium is not changed. As a result, the edge of the medium is inserted into a corresponding one of the at least one notch, and is detected by a corresponding one of the at least one medium detection means. Thus, the detection of the medium having protruded to the outside from a corresponding one of the at least one edge regulation position for the edge regulation by the at least one edge guide is appropriately made.

According to a seventh configuration of the image reading apparatus according to the aspect of the invention, in the sixth configuration, preferably, the relevant image reading apparatus further includes at least one separation roller each configured to separate the medium by nipping the medium with a corresponding one of the at least one feeding roller, and the at least one notch is disposed in a place including at least one nip position between the at least one feeding roller and the at least one separation roller.

According to this configuration, the at least one notch, that is, the at least one medium detection means, is disposed near at least one place (that is, at least one nip position between the at least one feeding roller and the at least one separation roller) at which factors of the occurrence of an oblique movement are likely to arise, and thus, the oblique movement is promptly and appropriately detected.

According to an eighth configuration of the image reading apparatus according to the aspect of the invention, in any one of the first to seventh configurations, preferably, each of the at least one medium detection means includes a first facing portion facing a first face of the medium, and a second facing portion facing a second face that is an opposite side face of the first face. Further, preferably, the first facing portion includes a light emitting portion configured to emit detection light toward the medium, and a first light receiving portion configured to receive a reflected light element of the detection light having been emitted from the light emitting portion, and the second facing portion includes a second light receiving portion configured to receive the detection light having been emitted from the light emitting portion.

According to this configuration, the first facing portion is configured to include the light emitting portion configured to emit detection light toward the medium, and the first light receiving portion configured to receive a reflected light element of the detection light having been emitted from the light emitting portion, and the second facing portion is configured to include the second light receiving portion configured to receive the detection light having been emitted from the light emitting portion. That is, the above configuration allows the single light emitting portion to be utilized as a light emitting portion common to the first light receiving portion and the second light receiving portion, and thus, both of the merit of the detection using a reflected-light receiving method and the merit of the detection using a transmitted-light receiving method are brought about, and simultaneously therewith, the cost reduction of the at least one medium detection means is achieved.

According to a ninth configuration of the image reading apparatus according to the aspect of the invention, in any one of the first to eighth configurations, preferably, the at least one medium detection means is located on the further upstream side than the reading means in the medium feeding direction.

According to a tenth configuration of the image reading apparatus according to the aspect of the invention, in any one of the first to ninth configurations, preferably, the relevant image reading apparatus further includes a control means configured to control the feeding means, and the control means performs first processing in response to a detection of the medium by any one of the at least one medium detection means.

According to an eleventh configuration of the image reading apparatus according to the aspect of the invention, in the tenth configuration, preferably, the first processing is processing for stopping the feeding of the medium by the feeding means.

According to this configuration, the feeding of the medium by the feeding means is stopped in response to the detection of the medium by any one of the at least one medium detection means, and thus, the damage of an edge of the medium is eliminated or minimized.

According to a twelfth configuration of the image reading apparatus according to the aspect of the invention, in the ninth configuration, preferably, the relevant image reading apparatus further includes an anterior end detection means configured to detect the passing of the anterior end of the medium and disposed on the further downstream side than the at least one medium detection means in the medium feeding means. Further, preferably, the control means, configured to control the reading means, allows the reading means to start reading of the medium in the case where, before the detection of the anterior end of the medium by the anterior end detection means, the medium is detected by any one of the at least one medium detection means.

According to this configuration, the control means, configured to control the reading means, allows the reading means to start the reading of the medium in the case where, before the detection of the anterior end of the medium by the anterior end detection means, the medium is detected by any one of the at least one medium detection means, and thus, even when such significant skew that, because of an oblique movement of the medium, causes part of the anterior end of the medium to have already reached the reading means at the time when the anterior end detection means detects the anterior end of the medium has occurred, the lack of an image to be read is eliminated or minimized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. It should be noted that, in individual practice examples of the embodiment, identical components will be denoted by identical reference signs, and the description of each of such components will be made only in its first practice example, but the description thereof will be omitted in its subsequent one or more practice examples.

Figure 1:
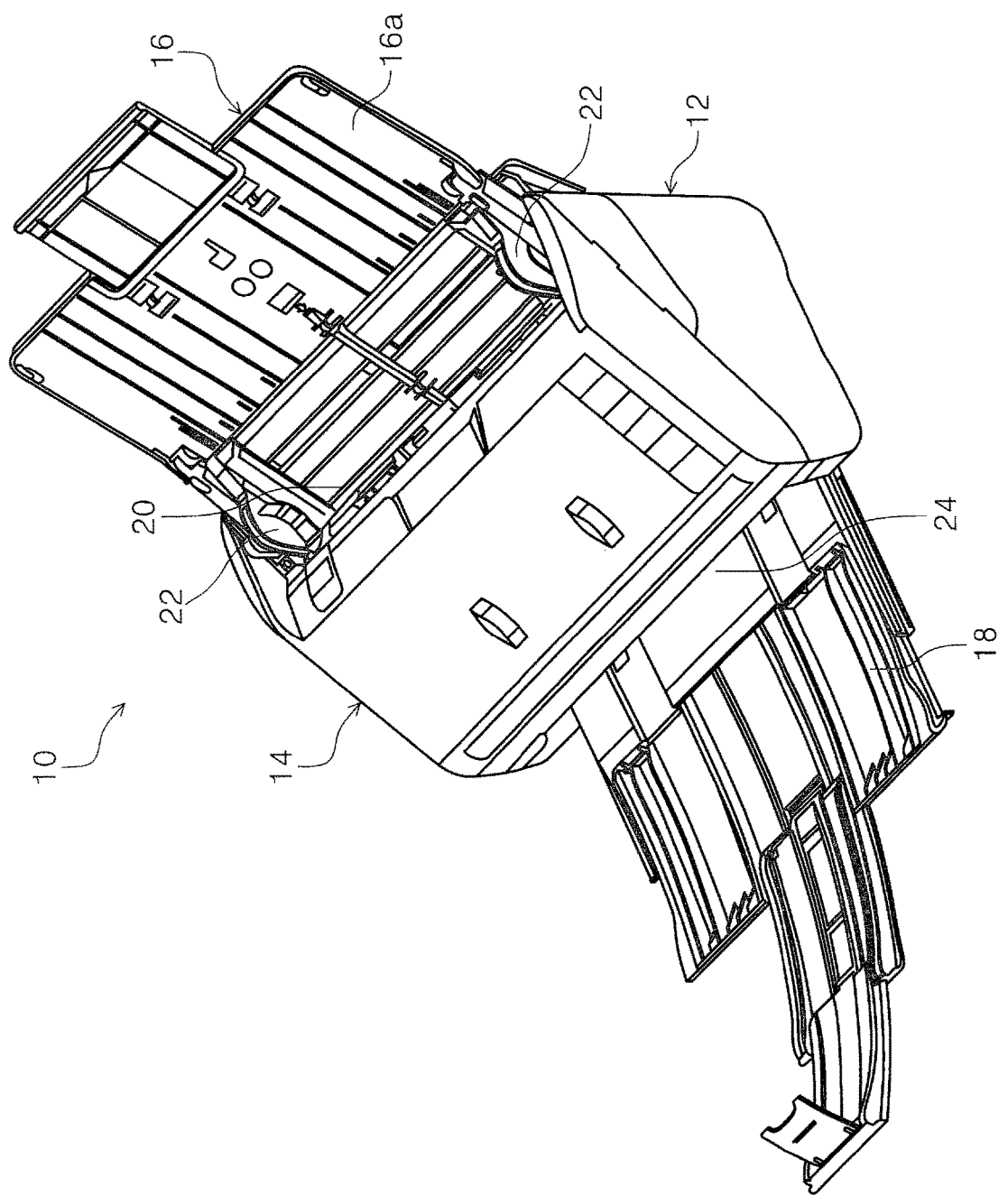
FIG. 1 is an external perspective view of a scanner according to an embodiment of the invention.
Figure 2:
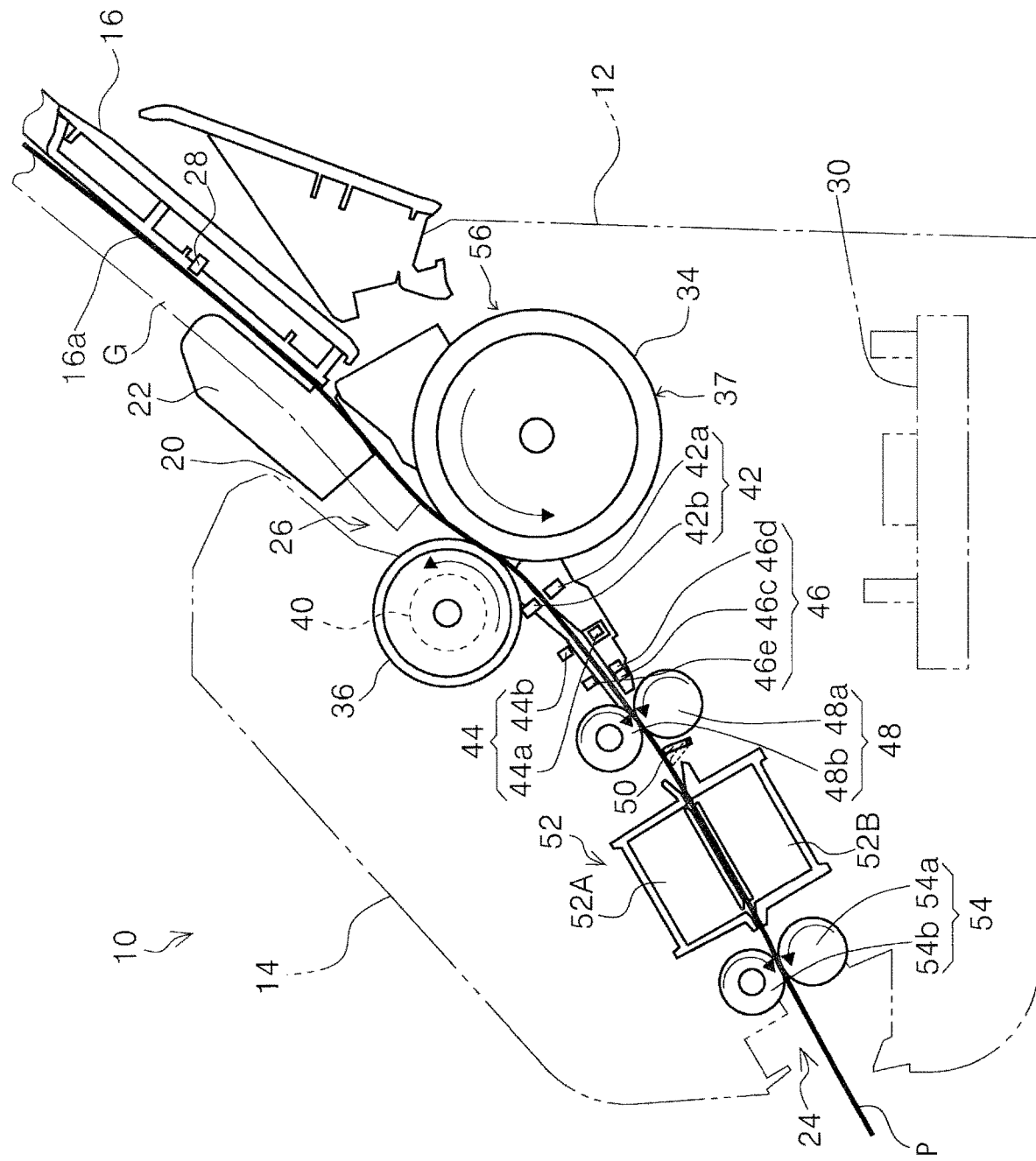
FIG. 2 is a side view of the scanner, according to the embodiment of the invention, illustrating a medium feeding path of the scanner.
Figure 3:
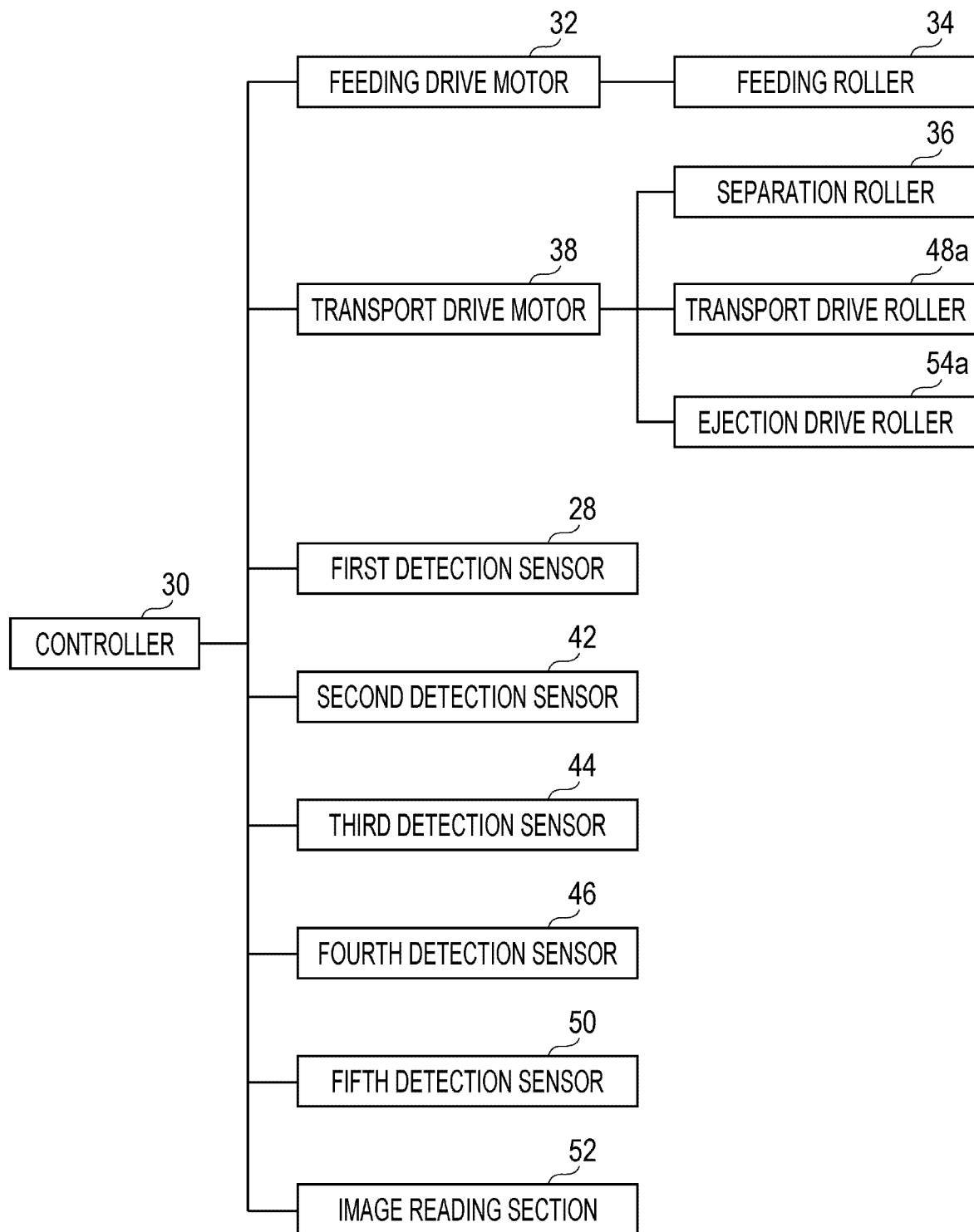
FIG. 3 is a block diagram of constituent elements constituting the scanner.
Figure 4:
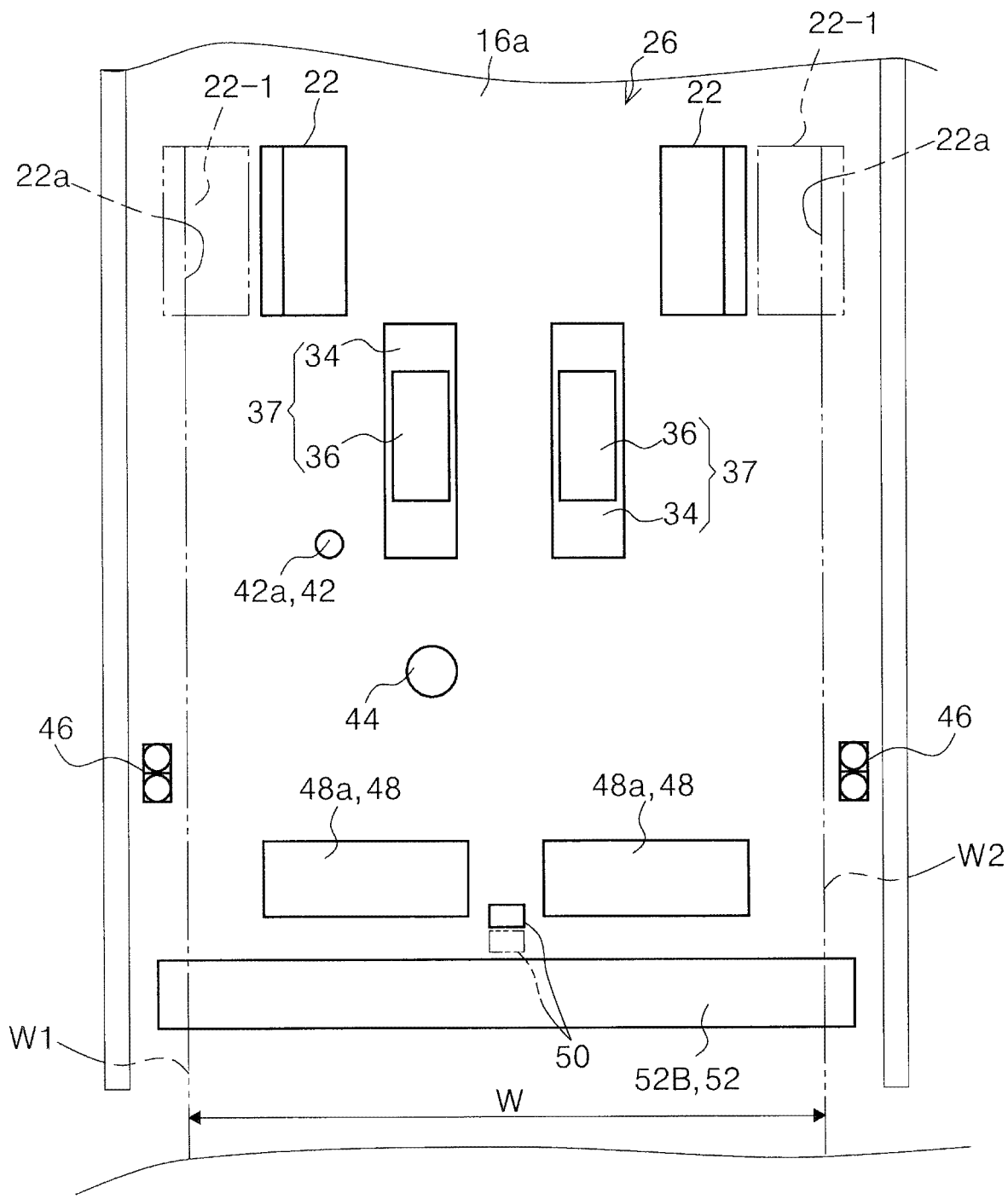
FIG. 4 is a diagram schematically illustrating the medium feeding path of the scanner.
Figure 5:
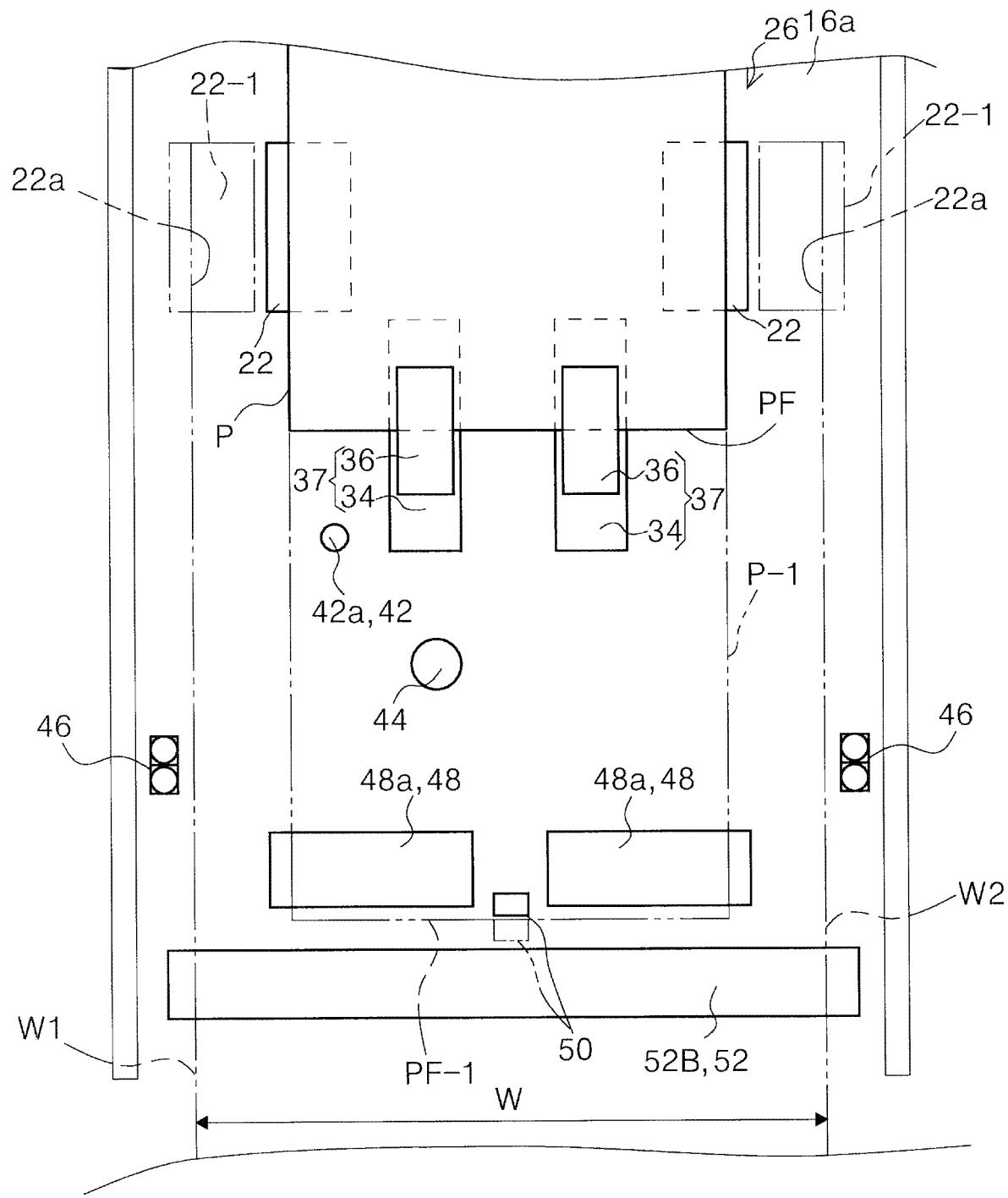
FIG. 5 is a diagram schematically illustrating the medium feeding path of the scanner and illustrating a normal feeding state.
Figure 6:
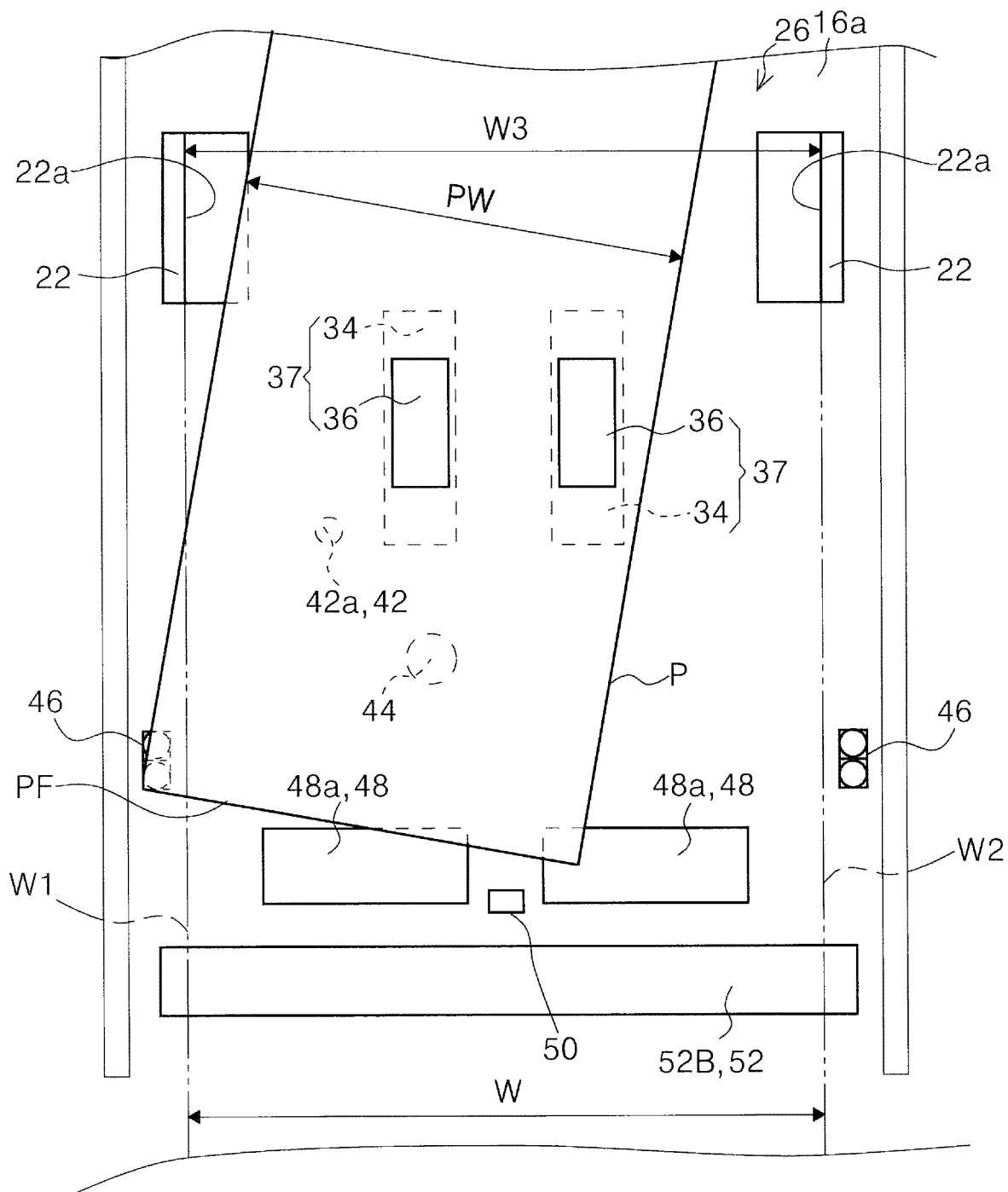
FIG. 6 is a diagram schematically illustrating the medium feeding path of the scanner and illustrating a state in which skew of a medium has occurred.
Figure 7:
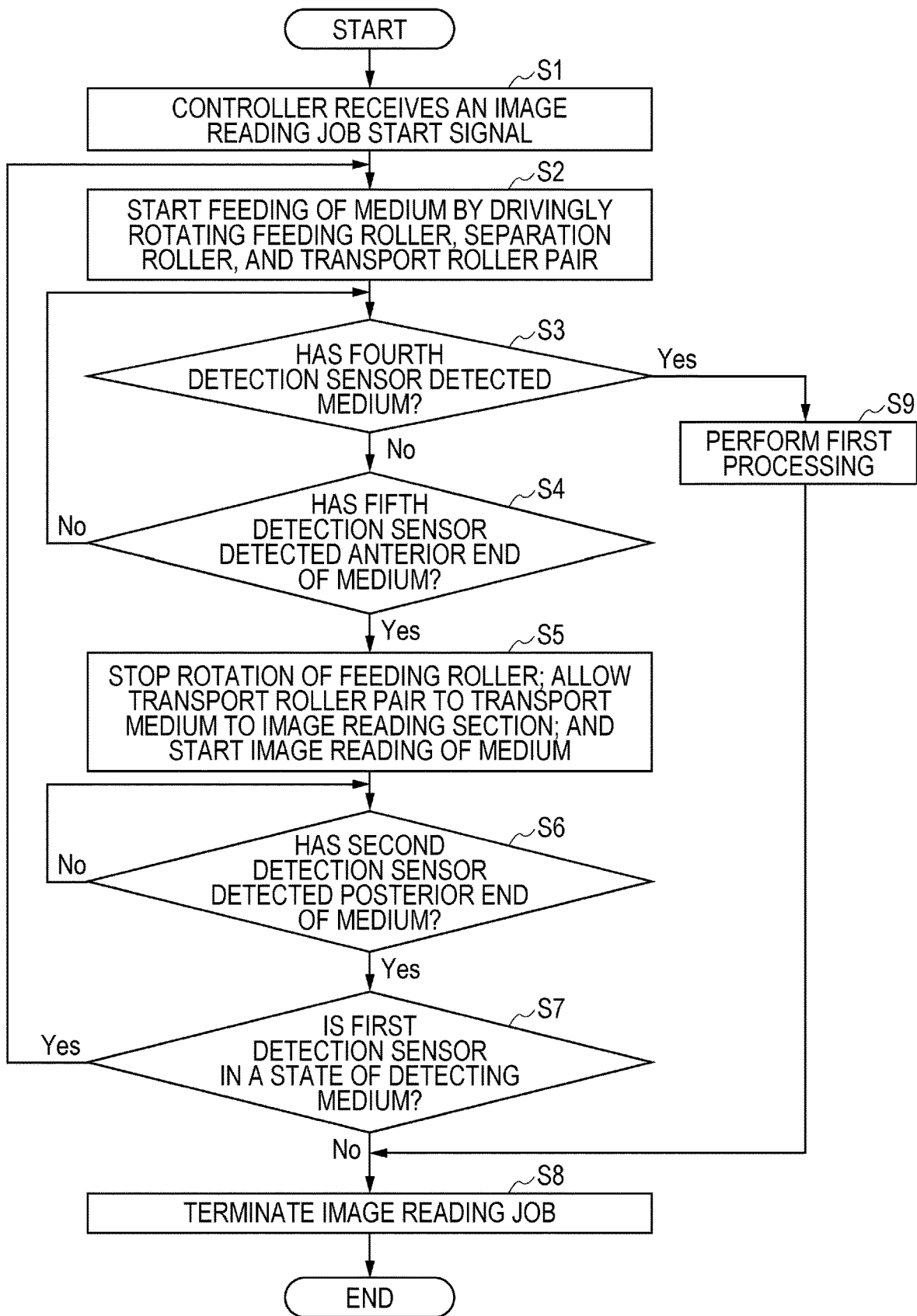
FIG. 7 is a flowchart of the feeding of a medium in the scanner, according to the embodiment of the invention.

FIG. 1 is an external perspective view of a scanner according to an embodiment of the invention; FIG. 2 is a side view of the scanner, according to the embodiment of the invention, illustrating a medium feeding path of the scanner; FIG. 3 is a block diagram of constituent elements constituting the scanner; FIG. 4 is a diagram schematically illustrating the medium feeding path of the scanner; FIG. 5 is a diagram schematically illustrating the medium feeding path of the scanner and illustrating a normal feeding state; FIG. 6 is a diagram schematically illustrating the medium feeding path of the scanner and illustrating a state in which skew of a medium has occurred; and FIG. 7 is a flowchart of the feeding of the medium in the scanner, according to the embodiment of the invention.

Figure 8:
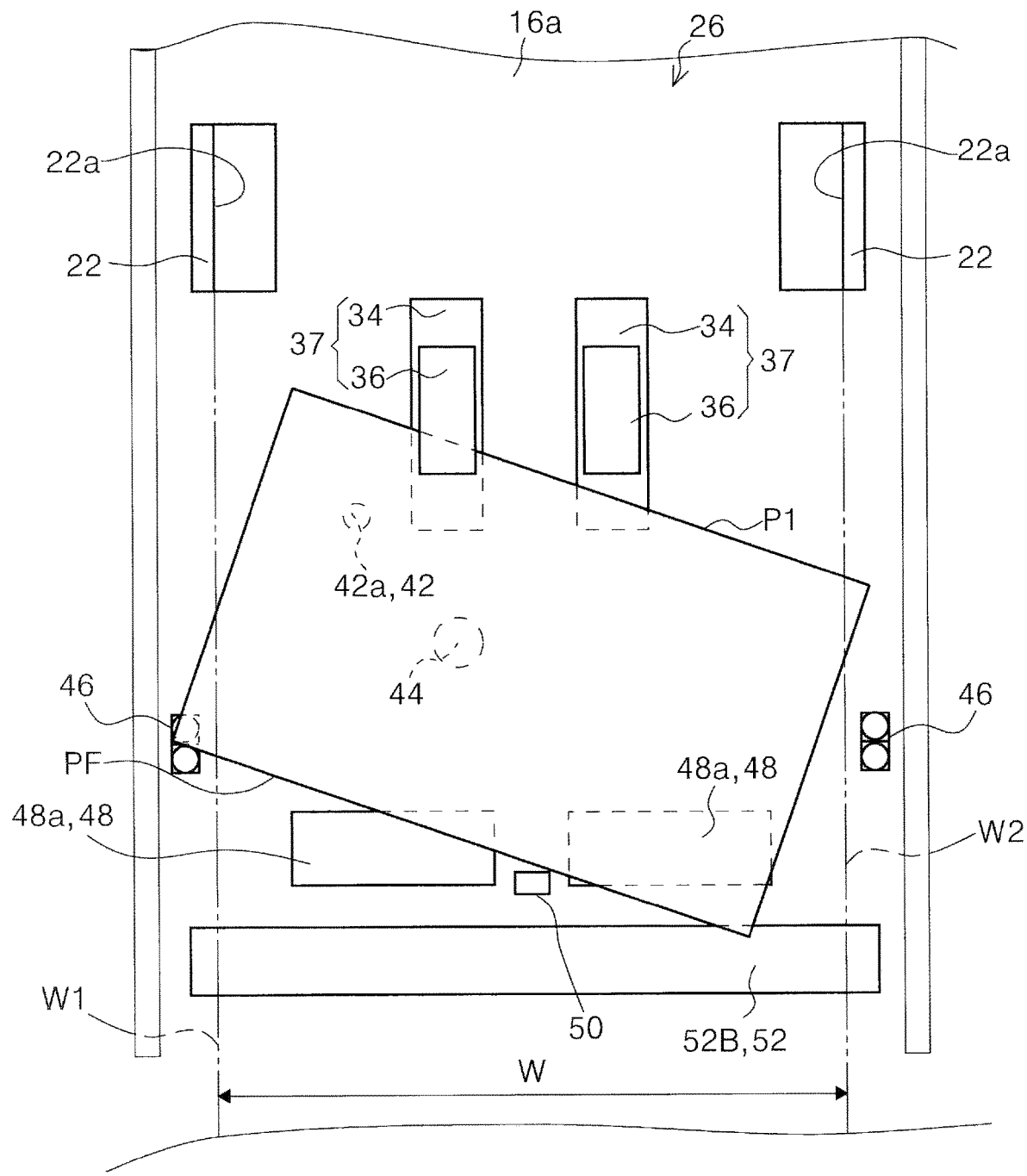
FIG. 8 is a diagram schematically illustrating the medium feeding path of the scanner and illustrating a state in which part of the medium has reached an image reading section before the medium is detected by a fifth detection sensor.
Figure 8:
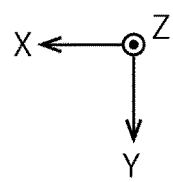
Figure 9:
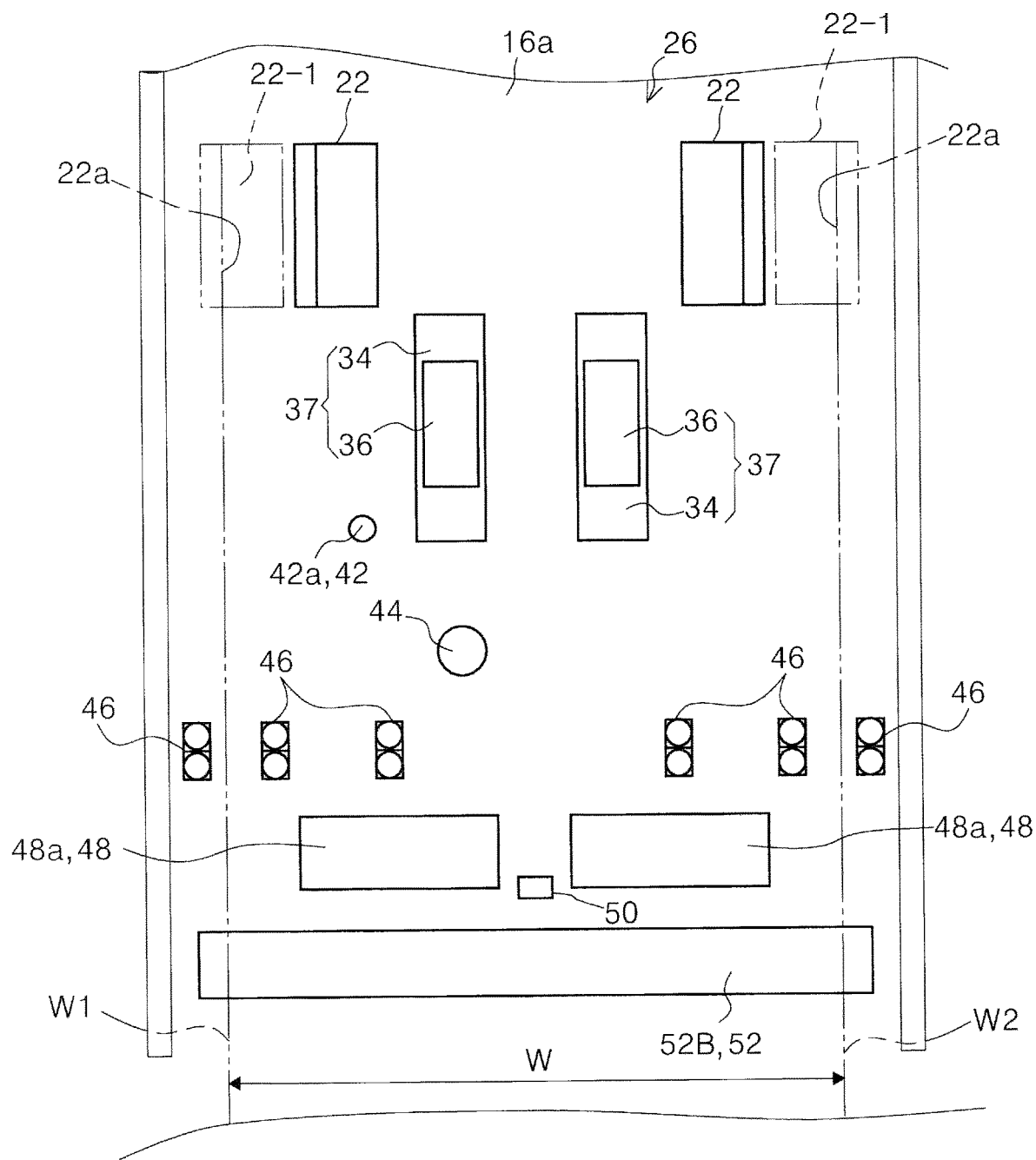
FIG. 9 is a diagram illustrating a configuration in which a plurality of fourth detection sensors are disposed in an apparatus width direction on the medium feeding path of the scanner.
Figure 10:
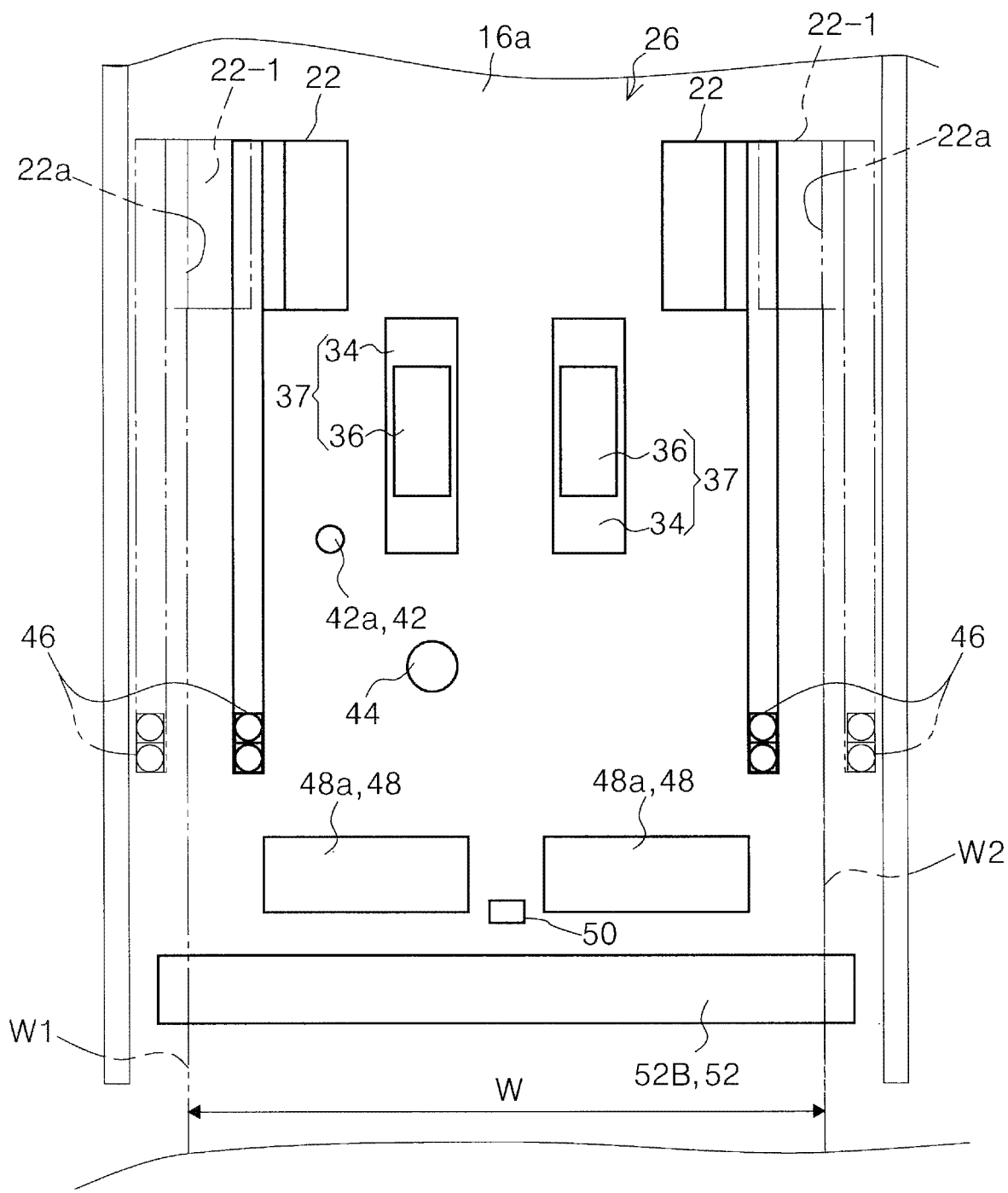
FIG. 10 is a diagram illustrating a configuration in which the fourth detection sensors are each disposed on the medium feeding path of the scanner so as to be movable together with a corresponding one of edge guides in the apparatus width direction.
Figure 11:
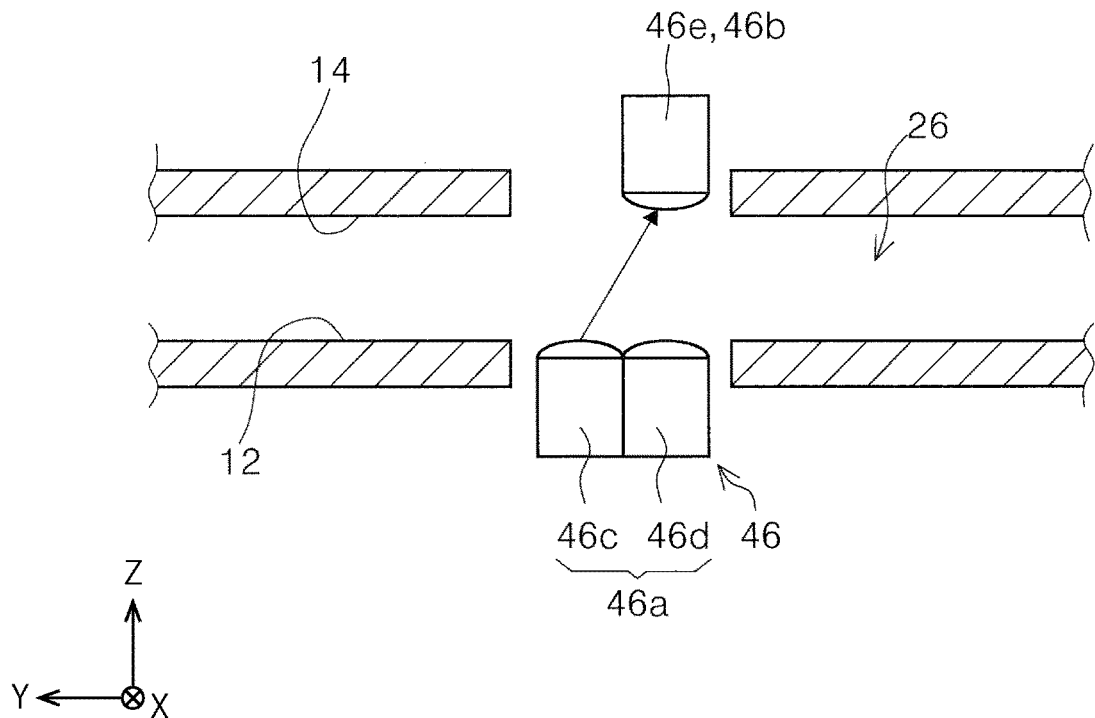
FIG. 11 is a diagram schematically illustrating the configuration of each of the fourth detection sensors, according to the embodiment of the invention.
Figure 12:
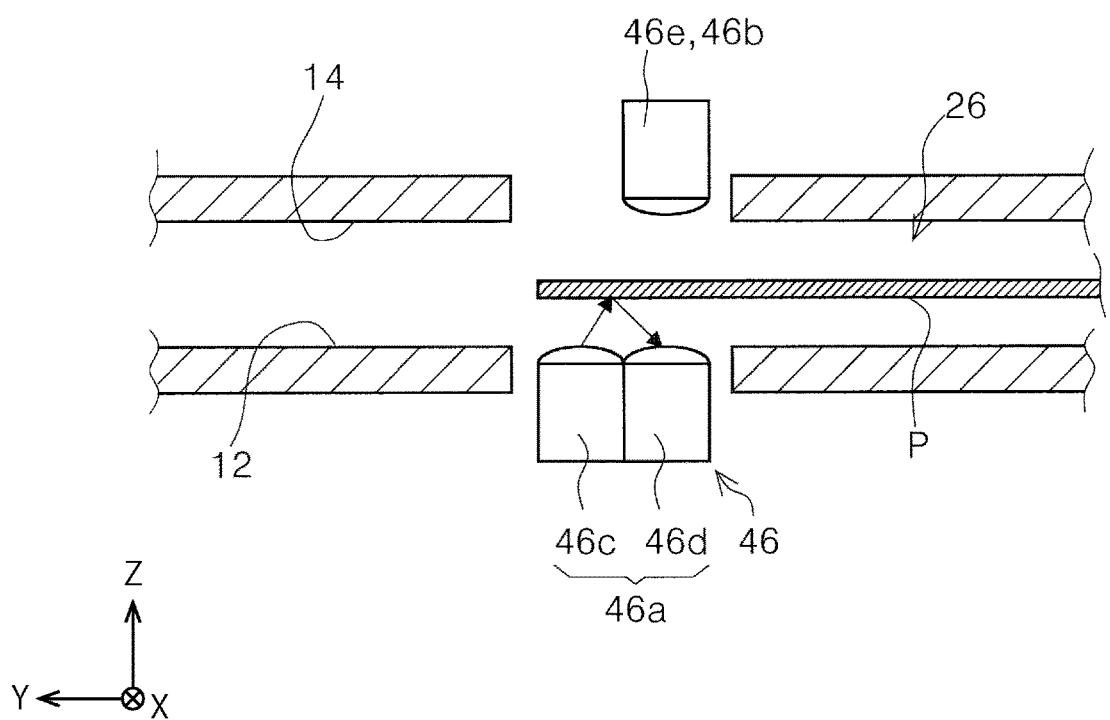
FIG. 12 is a diagram illustrating a state in which a medium (normal paper) has been detected in one of the fourth detection sensors.

FIG. 8 is a diagram schematically illustrating the medium feeding path of the scanner and illustrating a state in which part of the medium has reached an image reading section before the medium is detected by a fifth detection sensor; FIG. 9 is a diagram illustrating a configuration in which a plurality of fourth detection sensors are disposed in an apparatus width direction on the medium feeding path of the scanner; FIG. 10 is a diagram illustrating a configuration in which the fourth detection sensors are each disposed on the medium feeding path of the scanner so as to be movable together with a corresponding one of edge guides in the apparatus width direction; FIG. 11 is a diagram schematically illustrating the configuration of each of the fourth detection sensors according to the embodiment of the invention; and FIG. 12 is a diagram illustrating a state in which a medium (normal paper) has been detected in one of the fourth detection sensors.

Figure 13:
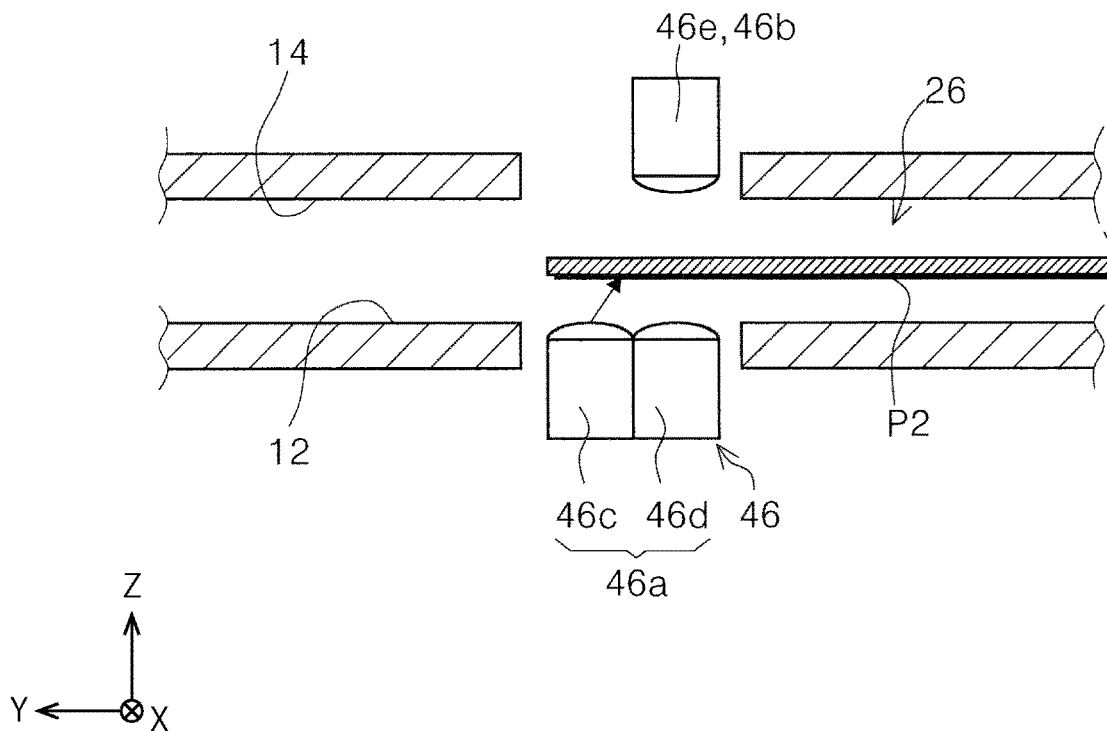
FIG. 13 is a diagram illustrating a state in which a medium having been subjected to black printing has been detected in one of the fourth detection sensors.
Figure 14:
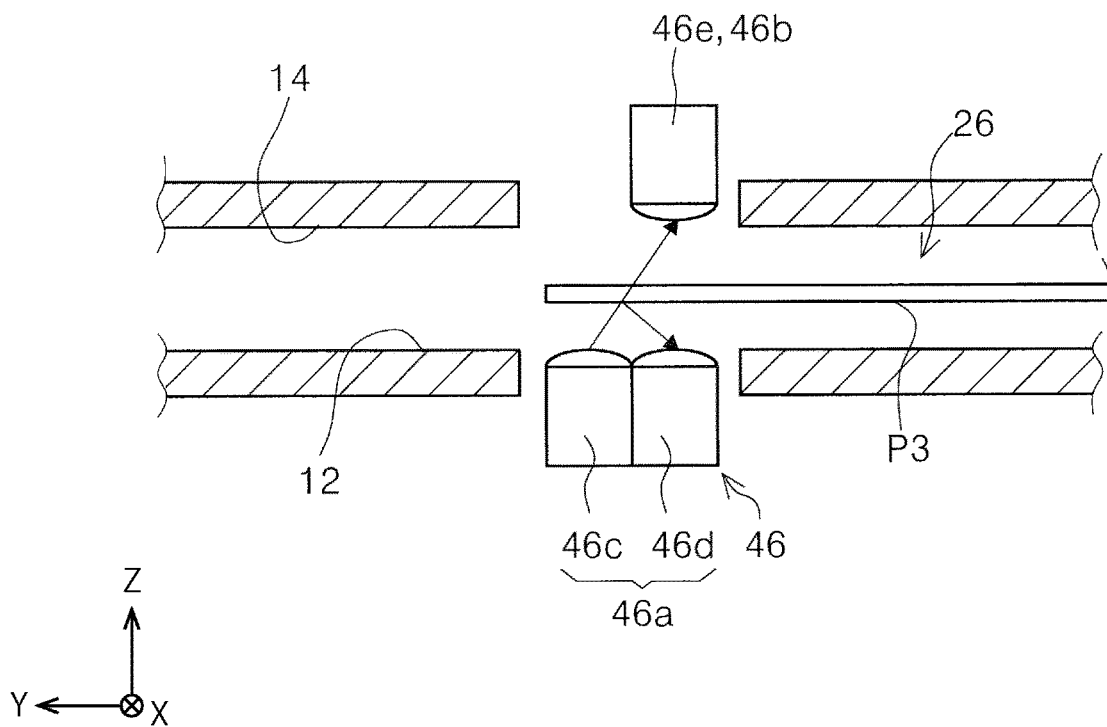
FIG. 14 is a diagram illustrating a state in which a transparent medium has been detected in one of the fourth detection sensors.
Figure 15:
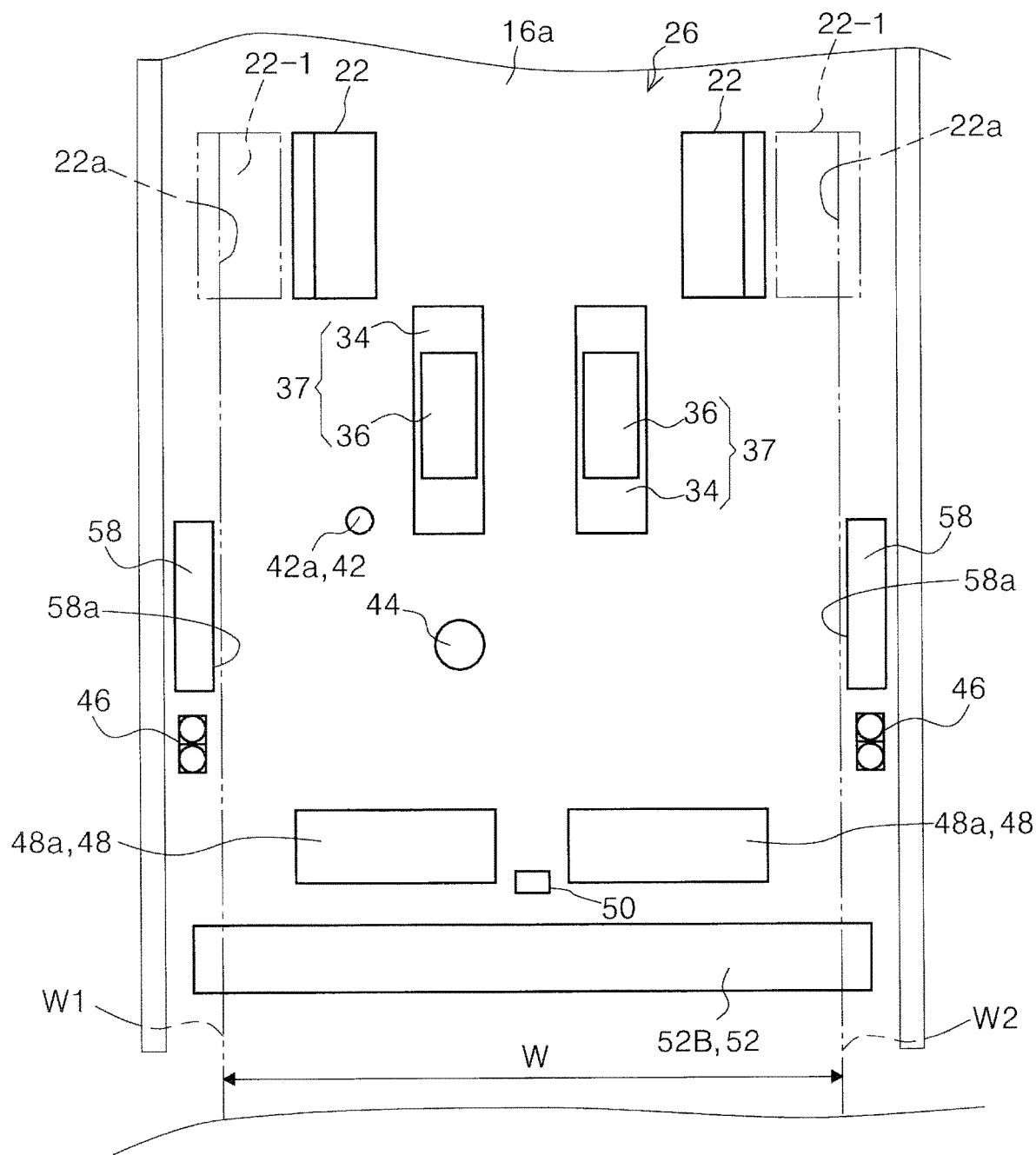
FIG. 15 is a diagram illustrating a configuration in which wall portions are disposed on the upstream side of the fourth detection sensors in the medium feeding path of the scanner.
Figure 16:
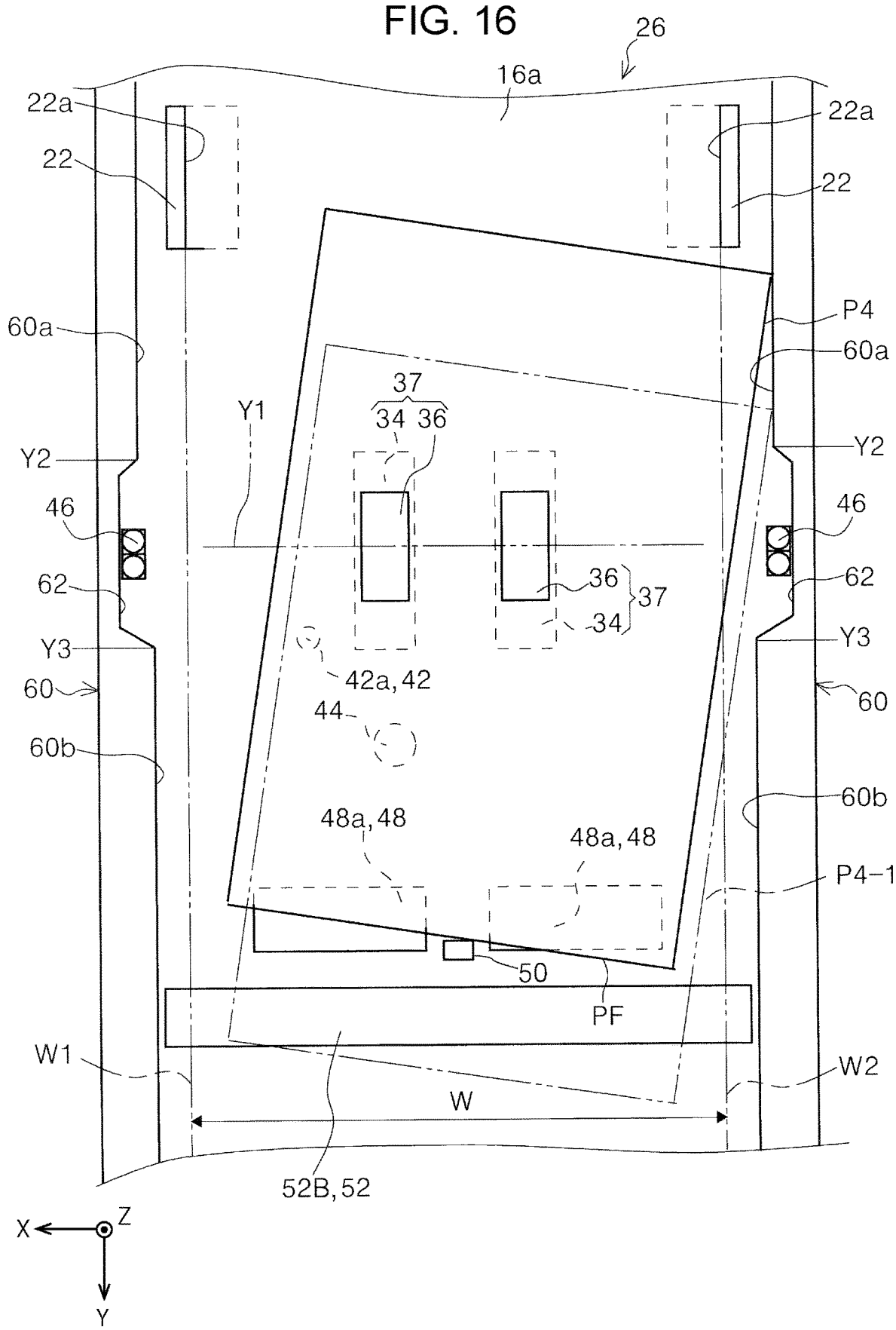
FIG. 16 is a diagram illustrating a state in which a medium having high rigidity has been fed in a configuration of the medium feeding path, in which each of the fourth detection sensors is disposed in a corresponding one of notches of feeding guides.
Figure 17:
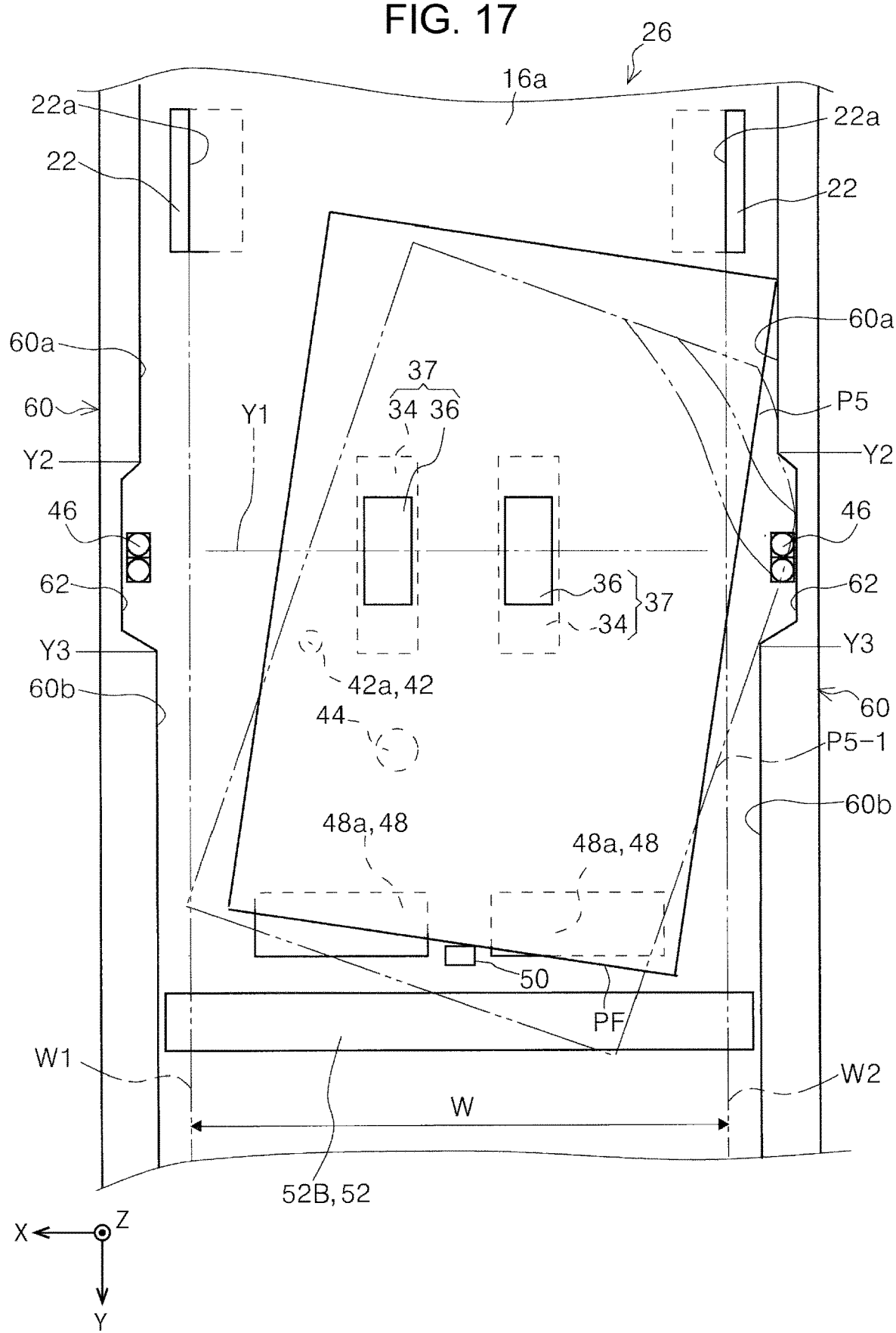
FIG. 17 is a diagram illustrating a state in which a medium having low rigidity has been fed in a configuration of the medium feeding path, in which each of the fourth detection sensors is disposed in a corresponding one of the notches of the feeding guides.

FIG. 13 is a diagram illustrating a state in which a medium having been subjected to black printing has been detected in one of the fourth detection sensors; FIG. 14 is a diagram illustrating a state in which a transparent medium has been detected in one of the fourth detection sensors; FIG. 15 is a diagram illustrating a configuration in which wall portions are disposed on the upstream side of the fourth detection sensors in the medium feeding path of the scanner; FIG. 16 is a diagram illustrating a state in which a medium having high rigidity has been fed in a configuration of the medium feeding path, in which each of the fourth detection sensors is disposed in a corresponding one of notches of feeding guides; and FIG. 17 is a diagram illustrating a state in which a medium having low rigidity has been fed in the configuration of the medium feeding path, in which each of the fourth detection sensors is disposed in a corresponding one of the notches of the feeding guides.

Further, in an X-Y-Z coordinate system illustrated in each of the figures, an X direction corresponds to the apparatus width direction and a paper width direction; a Y direction corresponds to a paper transport direction in an image reading apparatus; and a Z direction is a direction orthogonal to the Y direction, and indicates a direction approximately orthogonal to the face of paper being transferred. Additionally, in each of the figures, a +Y-direction side is associated with an apparatus front side, and a −Y-direction side is associated with an apparatus rear side.

PRACTICE EXAMPLES

Outline of the Invention

A basic concept of these practice examples is that, in a scanner 10, which is an example given as the "image reading apparatus", sensors for detecting skew of a medium P are disposed outside the region of a transport path for transporting the medium P, and upon detection of the skew of the medium P by any one of the relevant sensors, predetermined processing in relation to the feeding of the medium P is performed.

Regarding Image Reading Apparatus

Referring to FIGS. 1 and 2, the scanner 10 includes a lower unit 12, an upper unit 14, a cover portion 16, and an ejection tray 18. In the present practice example, although not illustrated, the upper unit 14 is attached to the lower unit 12 so as to be pivotable relative to the lower unit 12 about a pivot supporting point on the paper transport direction downstream side of the lower unit 12.

Further, the cover portion 16 is attached to an upper portion of the rear side of the lower unit 12 so as to be pivotable relative to the lower unit 12. The cover portion 16 is capable of being in any one of two states: one being a non-feeding state (not illustrated) in which the cover 16 covers both of the upper unit 14 and a feeding inlet 20; the other one being a feeding enabled state in which, as shown in FIG. 1, the cover portion 16 is in a state of having been pivoted at the apparatus rear side and allowing the feeding inlet 20 to be in an exposed state. Further, as shown in FIG. 1, when the cover portion 16 is in the feeding enabled state, the back face of the cover portion 16 functions as a medium mounting portion 16a, and this medium mounting portion 16a mounts thereon the medium P.

Further, an ejection outlet 24 is disposed on the apparatus front side of the lower unit 12, and the medium P is ejected from this ejection outlet 24. Further, the lower unit 12 includes the ejection tray 18, and this ejection tray 18 is drawable from the ejection outlet 24 toward the apparatus front side. The ejection outlet 18 is capable of being two states: one being a state of being contained in the bottom portion of the lower unit 12 (this state being unillustrated); the other one being a state of being drawn at the apparatus front side (see FIG. 1). Further, in the present embodiment, the ejection tray 18 is constituted by a plurality of tray members coupled to one another, and the length of its portion drawn from the ejection outlet 24 is adjustable in accordance with the length of the medium P to be ejected.

Regarding Medium Transport Path in Scanner

Next, a medium transport path 26 in the scanner 10 will be described with reference to FIGS. 2 to 4. Further, in FIG. 2, for the lower unit 12 and the upper unit 14, only the outlines of their housings are represented by virtual lines. Note that, in FIG. 2, a thick line denoted by a reference sign P represents a guide path for a medium transported along the medium transport path 26 inside the scanner 10.

In the present practice example, the medium P that is set to be fed through the feeding inlet 20 is mounted on and supported by a medium mounting portion 16a, that is, the back face of the cover portion 16 taking a posture of having been pivoted at the apparatus rear side relative to the lower unit 12. For the feeding inlet 20, plural sheets of media P can be set. Further, a first detection sensor 28 is disposed on the medium mounting portion 16a. The first detection sensor 28 is constituted as, for example, a contact-type sensor having a lever or the like, or an optical sensor, and transmits a detection signal to a controller 30, described later, upon detection of the medium P having been set on the medium mounting portion 16a. Further, the medium mounting portion 16a is capable of setting thereon the plural sheets of media P.

In the present practice example, a pair of edge guides 22 is disposed on the medium mounting portion 16a. The pair of edge guides 22 is configured to be movable in a direction in which the edge guides 22 become close to/far from each other in the apparatus width direction. Further, when the medium P has been set on the medium mounting portion 16a, in order to hold the side portions of the medium P, the edge guides 22 are allowed to move to positions at which each of the edge guides 22 is in contact with a corresponding one of the side portions of the medium P in the apparatus width direction. With this operation, the feeding of the medium P is guided by the edge guides 22. Note that, in FIG. 4, portions each enclosed by a chain double-dashed line and denoted by a reference sign 22-1 indicate the edge guides 22 being in a state of being most distanced from each other in the apparatus width direction, that is, a width direction of the medium P.

A medium P mounted on the most bottom side among the media P having been mounted on the medium mounting portion 16a is fed by feeding rollers 34 toward the downstream side in the feeding direction. The feeding rollers 34 are driven and rotated by a feeding drive motor 32 (see FIG. 3). As an example, as shown in FIG. 4, two feeding rollers 34 are disposed at spaced positions in the apparatus width direction. The outer peripheral surface of each of the feeding rollers 34 is formed of a high friction material (for example, elastomer such as rubber).

Here, in FIG. 2, a reference sign G represents a bundle of media P having been mounted (set) on the medium mounting portion 16a. Before the feeding of the medium P, the anterior edge of the bundle G of the media P is held by an unillustrated stopper at a feeding waiting position (the position shown in FIG. 2) so as to be regulated from being inserted between the feeding rollers 34 and separation rollers 36. These separation rollers 36 will be described later. Note that the feeding rollers 34 and the separation rollers 36 constitute a feeding means 37.

Further, as shown FIG. 2, at a position facing each of the feeding rollers 34, a corresponding one of the separation rollers 36 is disposed. For the separation rollers 36 as well, as shown in FIG. 4, two separation rollers 36 are disposed, and these two separation rollers 36 are disposed at positions corresponding to the respective two feeding rollers 34 in the apparatus width direction. Each of the separation rollers 36 is disposed in a state of being energized relative to a corresponding one of the feeding rollers 34 by an unillustrated energizing means. Further, the each separation roller 36 is driven and rotated by a transport drive motor 38 (see FIG. 3) in a rotation direction (an anticlockwise direction in FIG. 2) opposite to the rotation direction of the corresponding feeding roller 34 (this rotation direction being an anticlockwise direction in FIG. 2, that is, a direction in which the medium P is fed toward the downstream side). In the present practice example, the outer peripheral surface of the each separation roller 36 is formed of a high friction material (for example, elastomer such as rubber) just like the each feeding roller 34.

Moreover, in the present practice example, the each separation roller 36 includes a torque limiter 40. The each separation roller 36 is configured to receive a drive torque of the transport drive motor 38 via the torque limiter 40.

Here, when a rotation torque received from the corresponding feeding roller 34 exceeds a limit torque of the torque limiter 40, the each separation roller 36 is disconnected from a driving system of the transport drive motor 38 by the torque limiter 40 so as to rotate following the rotation of the corresponding feeding roller 34 (in a clockwise direction in FIG. 2).

Further, in the case where, after the start of the feeding of the medium P, plural sheets of media P have been inserted between the each separation roller 36 and the corresponding feeding roller 34, the each separation roller 36 is brought into a state of not receiving the rotation torque from the corresponding feeding roller 34 and thus, the rotation of the each separation roller 36, which follows the rotation of the corresponding feeding roller 34, stops. Further, the each separation roller 36 receives a drive force of the transport drive motor 38 via the torque limiter 40 and starts to rotate in a rotation direction opposite to that of the corresponding feeding roller 34 (i.e., in the anticlockwise direction in FIG. 2). With this rotation, one or more upper media P other than the lowermost medium P to be fed (i.e., one or more media P to be prevented from being multi-fed) do not receive any transport force for proceeding toward the downstream side, and thus are caused to return to the upstream side in the transport direction by the rotation of the each separation roller 36. With this configuration, the multi-feeding of the media P is prevented. Note that the lowermost medium P to be fed is in direct contact with the corresponding feeding roller 34, and thus, is caused to proceed toward the downstream side by the transport force received from the corresponding feeding roller 34.

Subsequently, in the medium transport path 26, a second detection sensor 42 is disposed on the downstream side of the feeding rollers 34 and the separation rollers 36. This second detection sensor 42 detects the feeding of the medium P. Further, as an example, as shown in FIG. 4, the second detection sensor 42 is disposed within a transport region W. This transport region W is a region for transporting a medium P having a maximum feedable size in the apparatus width direction of the medium transport path 26. The second detection sensor 42 is constituted as, for example, an optical sensor, and includes a light emitting portion 42a and light receiving portion 42b. Further, the light emitting portion 42a and light receiving portion 42b are disposed at a position where the light emitting portion 42a and light receiving portion 42b face each other via the medium transport path 26 interposed therebetween. Further, the second detection sensor 42 is configured to, when a medium P has been transported on the medium transport path 26, allow the medium P to be detected in such a way as to cause the medium P to block detection light from the light emitting portion 42a. Further, upon detection of the medium P, the second detection sensor 42 transmits a detection signal to the controller 30.

Here, the medium transport region W in the apparatus width direction will be described with reference to FIG. 4. The medium transport region W is set to the width of a medium P having a maximum feedable size in the scanner 10. Specifically, the medium transport region W is set as a region between guide faces 22a of the pair of edge guides 22-1 being in a state of being most distanced from each other in the apparatus width direction, each of the guide faces 22a serving as the "edge regulation position". Note that, in FIG. 4, a chain double-dashed line denoted by a reference sign W1 indicates the position of one of the guide faces 22a that is an edge regulation position of a left-side one of the edge guides 22-1 being in a state of being most distanced from each other in the apparatus width direction; and another chain double-dashed line denoted by a reference sign W2 indicates the position of the other one of the guide faces 22a that is an edge regulation position of a right-side one of the edge guides 22-1 being in a state of being most distanced from each other in the apparatus width direction.

Referring to FIG. 2 again, in the medium transport path 26, a third detection sensor 44 is disposed on the downstream side of the second detection sensor 42 in the medium transport path 26. This third detection sensor 44 detects the multi-feeding of the media P. Further, as shown in FIG. 4, the third detection sensor 44 is disposed within the medium transport region W in the apparatus width direction. In the present practice example, the third detection sensor is constituted as an ultrasonic sensor including a speaker portion 44a and a microphone portion 44b. Further, the third detection sensor 44 is configured to allow the speaker portion 44a to oscillate and emit ultrasonic waves toward the medium P passing through the medium transport path 26, and allow the microphone portion 44b to detect reflected waves from the medium P. In the present practice example, the third detection sensor 44 is configured to not only detect the multi-feeding of the media P, but also be capable of detecting the kind of paper, such as thick paper.

Further, in the medium transport path 26, fourth detection sensors 46 are disposed on the downstream side of the third detection sensor 44. Each of the fourth detection sensors 46 serves as each of "the at least one medium detection means". As an example, as shown in FIG. 4, the fourth detection sensors 46 are disposed outside the medium transport region W. Specifically, at spaced positions in the apparatus width direction, there are disposed two fourth detection sensors 46: one being disposed outside the left-side edge portion W1 in the apparatus width direction of the medium transport region W; the other one being disposed outside the right-side edge portion W2 in the apparatus width direction of the medium transport region W. Each of the fourth detection sensors 46 detects a corresponding one of medium width direction edges of the medium P. This medium width direction is a direction intersecting with the medium transport direction. A specific configuration of each of the fourth detection sensors 46 will be described later.

Further, in the medium transport path 26, transport roller pairs 48 are disposed on the downstream side of the fourth detection sensors 46. Further, as shown in FIG. 4, two transport roller pairs 48 (transport drive rollers 48a) are disposed at spaced positions in the apparatus width direction. Each of the transport roller pairs 48 includes the transport drive roller 48a and a transport driven roller 48b. The transport driven roller 48b is driven by the transport drive roller 48a to rotate relative to the transport drive roller 48a. In the present practice example, the transport drive rollers 48a are driven and rotated by the transport drive motor 38.

Further, in the medium transport path 26, a fifth detection sensor 50 is disposed on the downstream side of the transport roller pairs 48. As an example, the fifth detection sensor 50 is constituted as a touch sensor having a lever. Here, when the medium P is transported along the medium transport path 26, the lever of the fifth detection sensor 50 is pushed by the anterior end of the medium P and is pivoted toward the downstream side in the transport direction (see a chain double-dashed line portion in each of FIGS. 2 and 4). Through this operation, the fifth detection sensor 50 detects the medium P. Further, upon detection of the medium P, the fifth detection sensor 50 transmits a detection signal to the controller 30.

On the downstream side of the fifth detection sensor 50, an image reading section 52 is disposed. This image reading section 52 serves as the "reading means". Here, the image reading section 52 includes an upper reading unit 52A and a lower reading unit 52B. The upper reading unit 52A is attached to the upper unit 14 so as to face the upper face of the medium P being transported along the medium transport path 26. The lower reading unit 52B is attached to the lower unit 12 so as to face the lower face of the medium P being transported along the medium transport path 26. In the present practice example, the upper reading unit 52A and the lower reading unit 52B are constituted as a reading unit, and, as an example, these units are constituted as a contact type image sensor (CISM).

After an image on at least one of the obverse side and the adverse side of the medium P has been read in the image reading section 52, the medium P is nipped by an ejection roller pair 54 and is ejected from the ejection outlet 24. The ejection roller pair 54 is located on the downstream side of the image reading section 52.

Further, in the present practice example, the ejection roller pair 54 includes an ejection drive roller 54a and an ejection driven roller 54b. The ejection driven roller 54b is driven by the ejection drive roller 54a to rotate relative to the ejection drive roller 54a. In the present practice example, the ejection drive roller 54a is driven and rotated by the transport drive motor 38. Note that, in the above description, the transport drive roller 48a and the ejection drive roller 54a are configured to be driven and rotated by a common driving source, that is, the transport drive motor 38, but may be configured to be individually driven and rotated by mutually different driving sources.

Further, the controller 30 (see FIG. 2) is disposed inside the lower unit 12. In the present practice example, the controller 30 is constituted as an electric circuit including a plurality of electronic components. The controller 30 receives detection signals from the first detection sensor 28, the second detection sensor 42, the third detection sensor 44, any one of the fourth detection sensors 46, and the fifth detection sensor 50, and then controls the upper reading unit 52A, the lower reading unit 52B, the feeding drive motor 32, which drives and rotates the feeding rollers 34, and the transport drive motor 38, which drives and rotates the transport drive rollers 48a and the ejection drive roller 54a.

Further, as an example, the controller 30 is configured to control the transport operation and the image reading operation of the medium P in the scanner 10. Further, the controller 30 may control operations needed for the execution of the medium reading operation in the scanner 10 in accordance with instructions from the outside (a PC or the like).

Further, in the present practice example, the medium mounting portion 16a, the feeding rollers 34, the edge guides 22, the fourth detection sensors 46 constitute a medium feeding apparatus 56.

Regarding Feeding of Medium

Next, the feeding of the medium P in the medium transport path 26 will be described with reference to FIGS. 5 to 7. Referring to FIG. 7, in step S1, the controller 30 receives an image reading job start signal. Further, in step S2, the controller 30 starts the feeding of the medium P (see the medium P represented by a full line in FIG. 5) by drivingly rotating the feeding rollers 34, the separation rollers 36, and the transport roller pairs 48 (the transport rollers 48a). Further, the medium P with its side portions guided by the edge guides 22 is fed toward the downstream side of the medium transport path 26. Further, the medium P having been fed to the downstream side is detected by the second detection sensor 42 and the third detection sensor 44. Further, in step S3, the controller 30 determines whether or not any one of the fourth detection sensors 46 has detected the medium P.

In the case where none of the fourth detection sensors 46 has detected the medium P, it is determined that, at minimum, such large skew (an oblique movement) of the medium P that causes the medium P to deviate from the medium transport region W is not occurring. Thus, the controller 30 continues the image reading job for the medium P. Further, in step S4, an anterior end PF-1 of a medium P-1 having been fed toward the downstream side in the transport direction (see a portion indicated by a chain double-dashed line and denoted by a reference sign P-1 in FIG. 5) is brought into contact with the fifth detection sensor 50, and the anterior end PF-1 of the medium P-1 presses the fifth detection sensor 50 toward the downstream side in the transport direction. As a result, the lever-shaped fifth detection sensor 50 is pivoted toward the downstream side in the transport direction, and detects the anterior end PF-1 of the medium P-1.

Further, in step S5, upon reception of the detection signal from the fifth detection sensor 50, the controller 30 stops the rotation of each of the feeding rollers 34 and allows the image reading section 52 to start the image reading of the medium P. Here, as shown in FIG. 5, the detection of the anterior end of the medium P-1 by the fifth detection sensor 50 means that the medium P-1 has been nipped by the transport roller pairs 48. Thus, the medium P-1 is transported toward the image reading section 52 by the transport roller pairs 48, and the image reading of the medium P-1 is performed in the image reading section 52.

Further, although not illustrated, when the medium P is further transported toward the downstream side in the transport direction, the controller 30 determines, in step S6, whether or not the second detection sensor 42 has detected the posterior end of the medium P. In the case where the second detection sensor 42 has not yet detected the posterior end of the medium P, the controller 30 continues the process of step S6 while allowing the transport roller pairs 48 to continue the transport of the medium P. Further, upon detection of the posterior end of the medium P by the second detection sensor 42, the controller 30 allows the process flow to proceed to step S7. Note that, in the present practice example, the configuration that, in step S6, allows the process flow to proceed to step S7 upon detection of the posterior end of the medium P by the second detection sensor 42 has been employed, but a configuration that allow the process flow to proceed to step S7, for example, upon detection of the posterior end of the medium P by the fifth detection sensor 50 may be employed.

Next, in step S7, the controller 30 determines whether or not the first detection sensor 28 is in a state of detecting a medium P. That is, the first detection sensor 28 detects whether or not a following medium P is set on the medium mounting portion 16a. Here, in the case where the following medium P is set on the medium mounting portion 16a, the controller 30 allows the process flow to return to step S2 to start the feeding of the following medium P from the medium mounting portion 16a and repeat the processes from step S2 to step S7.

Further, in the case where the following medium P is not set on the medium mounting portion 16a, after the medium P having been subjected to the reading of the image in the image reading section 52 has been ejected onto the ejection tray 18, the controller 30 stops the rotations of the transport roller pairs 48 and the ejection roller pair 54, and then terminates the image reading job.

Next, a process in the case where, in step S3, any one of the fourth detection sensors 46 has detected the medium P will be described. Upon detection of the medium P by any one of the fourth detection sensors 46, the controller 30 determines that skew of the medium P is occurring, and allows the process flow to proceed to step S9 to perform first processing. Further, after having performed the first processing, in step S8, the controller 30 terminates the image reading job.

Regarding Detection of Skew

Here, referring to FIG. 6, for example, there may occur a case where, after having set the medium P on the medium mounting portion 16a, a user forgets the setting of the edge guides 22 at positions for guiding the side portions of the medium P, or although a user has set the edge guides 22 at the guiding positions, the user carelessly touches any of the edge guides 22 and thereby the edge guides 22 are caused to move from the guiding positions for guiding the medium P. Further, there may occur a case where, in the apparatus width direction, the distance between the pair of edge guides 22, for guiding the side portions of the medium P, becomes larger than a width PW of the medium P, and as a result, the guide faces 22a are incapable of guiding the side faces of the medium P. Specifically, the above case is a case where, in the apparatus width direction, a distance W3 between the guide faces 22a of the edge guides 22 is larger the width PW of the medium P.

Further, when the medium P having been set between the edge guides 22 is transferred, there may occur a case where one of the side portions of the medium P is pressed to a corresponding one of the guide faces 22a of the edge guides 22 due to the bias between the transport forces of the feeding rollers 34 and/or the bias between the transport forces of the separation rollers 36. Here, since, in the case where the thickness of the medium P being transported is thin, the rigidity of the medium P is low, there may occur a case where the relevant side portion of the medium P yields to a force pressed by the corresponding guide face 22a, and as a result, the relevant side portion of the medium P is released or bends toward the upper side of the corresponding guide face 22a. In this case, the edge guides 22 become incapable of regulating the movement of the medium P in the apparatus width direction.

As a result, when the medium P has been fed to the downstream side in the medium transport path 26 by the feeding rollers 34, there may occur a case where the medium P moves obliquely relative to the path, that is, the medium P is in a skew state (in an oblique movement state) (i.e., the state of the medium P, shown in FIG. 6). Further, when the medium P has been in the skew state, part of the medium P protrudes to the outside of the medium transport region W in the apparatus direction. As a result, the part of the medium P passes on one of the fourth detection sensors 46 that is disposed outside the medium transport region W, and the relevant fourth detection sensor 46 detects the medium P. Further, when any one of the fourth detection sensors 46 has detected the medium P before the detection of the anterior end PF of the medium P by the fifth detection sensor 50, the controller 30 determines that skew of the medium P is occurring, and performs the first processing. Here, this first processing will be described below.

Regarding First Processing

In the present practice example, as an example, the first processing is processing for stopping the image reading job. More specifically, at the time when any one of the fourth detection sensors 46 has detected the medium P, as the first processing, the controller 30 stops the rotation drive of each of the feeding rollers 34 and the transport roller pairs 48 to stop the transport of the medium P. Here, in the case where the transport of the medium P is continued while the skew is remained as it is, a case where, in the image reading in the image reading section 52, part of the medium P protrudes from the image reading region between the upper reading unit 52A and the lower reading unit 52B, and as a result, part of an image to be read is lacked; a case where the medium P is brought into contact with one of the side walls of the medium transport path 26 and the damage or crease of the medium P occurs; or a case where, in the worst case, a paper jam occurs inside the medium transport path 26 may occur.

Consequently, the above configuration that causes the transport of the medium P to stop reduces the occurrence of the lack of part of a to-be-read image on the medium P, the damage of the medium P, the paper jam inside the medium transport path 26, and or/the like. That is, such failure occurrences can be dealt with without error because any one of the fourth detection sensors 46 directly detects that the medium P has been deviated from the medium transport region W due to the skew.

Further, the controller 30 issues an error signal by, for example, displaying error information on a display (a display means or the like) of an externally connected PC or the like. As a result, a user is able to, based on the error information, pivot the upper unit 14 relative to the lower unit 12, and then, remove, from the medium transport path 26, the medium P for which the skew has occurred. Thereafter, the user is able to perform the reading operation for the relevant medium P by setting the relevant medium P again on the medium mounting portion 16a, and setting the edge guides 22 to the positions for guiding the side portions of the medium P.

Other Practice Examples of First Processing

Next, other practice examples of the first processing will be described with reference to FIG. 8. As shown in FIG. 8, the degree of skew of a medium P1 (the angle of skew of a medium P1) depends on the width size of the medium P1, the length size of the medium P1 in the transport direction, the degree of the opening of each of the edge guides 22 relative to the medium P1 in the apparatus width direction, and/or the like. Further, when the degree of the skew of the medium P1 becomes large, there may occur a case where, in a state in which part of the medium P is detected by any one of the fourth detection sensors 46, part of the anterior end PF of the medium P1 is in a state of having reached the image reading section 52 although the fifth detection sensor 50 has not yet detected the anterior end PF of the medium P1. In such a state, even though the image reading is started upon detection of the anterior end PF of the medium P1 by the fifth detection sensor 50, part of data related to a to-be-read image on the medium P1 is lacked because the timing of the start of the image reading is delayed from the timing when the part of the medium P1 has reached the image reading section 52.

Thus, in another practice example of the first processing, upon detection of the medium P by any one of the fourth detection sensors 46, the controller 30 may perform control so as to start the reading of the medium P in the image reading section 52 even though the fifth detection sensor 50 has not yet detected the anterior end PF of the medium P. With this configuration, the problem in that the timing of the start of the image reading is delayed from the timing when part of the medium P1 has reached the image reading section 52 can be expected to be prevented from occurring, and thus, the problem in that part of data related to a to-be-read image on the medium P1 is lacked can be expected to be prevented from occurring.

Further, as further another practice example, after the detection of the medium P by any one of the fourth detection sensors 46, the controller 30 may perform control so as to correct the skew of the medium P. Specifically, as an example, the medium feeding speed may be corrected so as to reduce the skew for the medium P by changing the speeds of the drives of the two feeding rollers 34, disposed at spaced positions in the apparatus width direction, to mutually different speeds. Note that, in the present practice example, instead of the above configuration in which the two feeding rollers 34 are driven and rotated by the same feeing drive motor 32, a configuration that allows each of the two feeding rollers 34 to be driven and rotated by a corresponding one of mutually different feeding drive motors is applicable.

Further, as another example of the correction of the skew, the parallel degrees of the separation rollers 36 relative to the feeding rollers 34 may be changed. Specifically, a configuration that allows each of the separation rollers 36 to be inclined relative to a corresponding one of the feeding rollers 34 by allowing the each separation roller 36 to be pivoted in the right direction or the left direction in the apparatus width direction, or a configuration that allows the two separation rollers 36 to be coupled to each other through a shaft member, and allows the shaft member to be pivoted, together with the separation rollers 36, toward the downstream side or the upstream side in the transport direction about a supporting point on a left-side portion or a right-side portion of the shaft member in the apparatus width direction may be employed. With these configurations, the parallel degrees of the separation rollers 36 relative to the feeding rollers 34 are changed, and thus, the medium P can be caused to rotate around the Z axis, thereby enabling the skew of the medium P to be reduced.

Modification Examples of Arrangement Positions of Fourth Detection Sensors (1) In the above practice example, the configuration in which the pair of fourth detection sensors 46 is disposed outside a transport region for a maximum feedable medium size in the scanner 10 has been employed, but instead of this configuration, a configuration that, as shown in FIG. 9, allows a plurality of pairs of fourth detection sensors 46 to be disposed at appropriate distance intervals in the apparatus width direction may be employed. Particularly, in the scanner 10, a configuration that allows the plurality of pairs of fourth detection sensors 46 to be each disposed in the apparatus width direction in accordance with a corresponding one of a plurality of feedable medium size standards is effective. Further, in this configuration, the size of the medium P being transported can be discriminated by detecting the positions of the edge guides 22 or the distance between the guide faces 22a of the edge guides 22 using a known detection means or the like. Further, the skew can be appropriately detected by selecting a pair of fourth detection sensor 46 that is suitable for the detection of the skew from among the plurality of pairs of fourth detection sensors 46 on the basis of the discriminated size of the medium P.

(2) Further, as shown in FIG. 10, the fourth detection sensors 46 may be each configured to be moved together with a corresponding one of the edge guides 22 in the apparatus width direction. In this configuration, the each fourth detection sensor 46 is disposed on the further outside than the guide face 22a of the corresponding edge guide 22. Further, the each fourth detection sensor 46 is moved in the apparatus width direction together with the corresponding edge guide 22, and thus, the detection of skew in accordance with the plurality of medium size standards can be made using the pair of fourth detection sensors 46. As a result, the number of sensors disposed on the medium transport path 26 is reduced, and thus, the cost reduction is achieved.

(3) Further, as shown in FIG. 15, in the medium transport direction, a pair of wall portions 58 may be disposed on the upstream side of the fourth detection sensors 46. In the wall portions 58, wall faces 58a, that is, medium transport path side wall faces of the wall portions 58, are located further inside than the fourth detection sensors 46. Further, one of the wall faces 58a is located further outside than the position W1, which is the position of one of the guide faces 22a of the two edge guides 22-1 being in a state of being most distanced from each other; and the other one of the wall faces 58a is located further outside than the position W2, which is the position of the other one of the guide faces 22a of the two edge guides 22-1 being in the state of being most distanced from each other. Further, the wall faces 58a function as guide faces for regulating the apparatus width direction movement of a medium being transported. With this configuration, the skew of the medium is reduced.

Additionally, a pair of wall portions 58 may be further disposed on the downstream side of the fourth detection sensors 46. In this case, notches each containing therein a corresponding one of the fourth detection sensors 46 and allowing a medium to be inserted thereinto toward the corresponding fourth detection sensor 46 are formed between the wall portions 58 on the upstream side and the wall portions on the downstream side. These notches correspond to notches 62, which will be described below with reference to FIGS. 16 and 17.

(4) Further, a configuration such as shown in FIGS. 16 and 17 may be employed. Referring to FIGS. 16 and 17, in the apparatus width direction, a pair of feeding guides 60 is disposed outside the guide faces 22a of the pair of edge guides 22. The pair of feeding guides 60 constitutes side walls of the medium transport path 26. The feeding guides 60 extend along the transport direction of the medium P. Further, in each of the feeding guides 60, a corresponding one of the notches 62 is disposed. Each of the notches 62 has a concave shape that is concaved from the inside toward the outside in the apparatus width direction.

As an example, the notches 62 are disposed at places each including a nip position Y1, and this nip position Y1 corresponds to nip points between the feeding rollers 34 and the separation rollers 36 in the medium feeding direction (see a chain double-dashed line extending in the right-left direction on the figure in each of FIGS. 16 and 17). Specifically, when, in the medium feeding direction, the beginning position of each of the notches 62 is denoted by Y2 and the end position of the each notch 62 is denoted by Y3, as an example, the beginning position Y2 is located on the further upstream side than the nip position Y1 in the medium feeding direction, and the end position Y3 is located on the further downstream side than the nip position Y1 in the medium feeding direction.

Further, when, in each of the feeding guides 60, a guide face on the further upstream side than the beginning position Y2 in the medium feeding direction is denoted by 60a, and a guide face on the further downstream side than the end position Y3 in the medium feeding direction is denoted by 60b, the upstream-side guide face 60a is located further outside than the downstream-side guide face 60b. Further, in the inside of each of the notches 62, a corresponding one of the fourth detection sensors 46 is disposed.

In the above configuration, a case where a medium P4 is fed will be described with reference to FIG. 16. This medium P4 has high rigidity. When the medium P4, having high rigidity, is nipped by the feeding rollers 34 and the separation rollers 36 and is fed toward the downstream side in the feeding direction, there may occur a case where an oblique movement of the medium P4 arises due to the variations of the transport forces with respect to the feeding rollers 34 and the separation rollers 36. Note that, in the present practice example, the oblique movement means a state in which, when the medium P4 is transported toward the downstream side in the transport direction, the medium P4 is transported toward the downstream side in the transport direction and further in the medium width direction while being subjected to, not only a transport force that is a transport-direction element, but also a transport force in a direction intersecting with the transport direction, that is, in the medium width direction.

Further, for example, when the medium P4 exits a state of being regulated by the edge guides 22, skew (a rotation) of the medium P4 occurs. Specifically, in FIG. 16, for the medium P4, a rotation in the clockwise direction and an oblique movement are occurring. As a result, the right-side portion of the medium P4 in the medium width direction is brought into contact with the upstream-side guide face 60a of one of the feeding guides 60. Here, since the medium P4 has high rigidity, even though the side portion thereof is brought into contact with the upstream-side guide face 60a, a distortion does not occur, or even when a distortion occurs, the distortion is a small distortion, and thus, the skew of the medium P4 is regulated by the upstream-side guide face 60a. With this configuration, at each of the nip points of the feeding rollers 34 and the separation rollers 36, slippages occur between the medium P4 and a corresponding one of the feeding rollers 34 and between the medium P4 and a corresponding one of the separation rollers 36. As a result, the oblique movement of the medium P4 is corrected (see a chain double-dashed line portion denoted by a reference sign P4-1), and the medium P4 is not inserted into any of the notches 62. Thus, none of the fourth detection sensors 46 detects the side portions of the medium P4. With this configuration, the feeding of the medium P4, having high rigidity, toward the downstream side in the transport direction can be continued.

Next, a case where a medium having low rigidity, that is, a medium P5, is fed will be described with reference to FIG. 17. When the medium P5, having low rigidity, has been fed toward the downstream side in the feeding direction and has exited a state of being regulated by the edge guides 22 while being nipped by the feeding rollers 34 and the separation rollers 36, in the case where skew of the medium P (a rotation in the clockwise direction in FIG. 17) occurs, the right-side portion of the medium P5 in the medium width direction is brought into contact with the upstream-side guide face 60a of one of the feeding guides 60. Here, since the medium P5 has low rigidity, when the side portion of the medium P5 has been brought into contact with the upstream side face 60a, the side portion of the medium P5 is caused to bend or crush at a contact portion of the medium P5. As a result, the medium P5 with its posture uncorrected is fed toward the downstream side as it is, and a side portion of the medium P5 is inserted into one of the notches 62 (see a chain double-dashed line portion denoted by a reference sign P5-1). With this configuration, a corresponding fourth detection sensor 46 detects the side portion of the medium P5. Through this detection, the medium P having protruded to the outside from the guide face 22a of a corresponding edge guide 22 is appropriately detected.

Further, in the medium feeding direction, the notches 62 are disposed at positions corresponding to the nip position Y1, that is, positions corresponding to a place where factors of the occurrence of the oblique movement are likely to arise, and thus, the oblique movement of the medium P is promptly and appropriately detected.

Note that, in the above modification example, the configuration that allows the upstream-side guide face 60a to be located further outside than the downstream-side guide face 60b has been employed, but instead of this configuration, a configuration that allows the upstream-side guide face 60a to be located further inside than the downstream-side guide face 60b may be employed.

Further, in the above modification example, in the medium transport direction, the positions of the notches 62 in the feeding guides 60 have been disposed at positions corresponding to the nip point position Y1, but instead of this configuration, the notches 62 may be disposed at positions further upstream side than the nip point position Y1 in the medium transport direction or may be disposed at positions further downstream side than the nip point position Y1 in the medium transport direction.

Regarding Configuration of Fourth Detection Sensor

Next, a configuration of each of the fourth detection sensors 46 will be described with reference to FIGS. 11 to 14. Referring to FIG. 11, each of the fourth detection sensors 46 includes a first facing portion 46a and a second facing portion 46b. The first facing portion 46a is disposed on the side of the lower unit 12, that is, on the side facing a first face of the medium P. The second facing portion 46b is disposed on the side of the upper unit 14, that is, on the side facing a second face of the medium P.

The first facing portion 46a includes a light emitting portion 46c and a first light receiving portion 46d. The light emitting portion 46c emits detection light to the medium P. The first light receiving portion 46d receives a reflected light element of the detection light having been emitted from the light emitting portion 46c. Further, the second facing portion 46b includes a second light receiving portion 46e, and this second light receiving portion 46e receives the detection light having been emitted from the light emitting portion 46c. That is, the light emitting portion 46c and the first light receiving portion 46d constitute a reflection sensor, and the light emitting portion 46c and the second light receiving portion 46e constitute a transparent sensor.

FIG. 11 illustrates a state in which the medium P is not transported at a position where the relevant fourth detection sensor 46 is disposed on the medium transport path 26. In this state, the detection light having been emitted from the light emitting portion 46c (see an arrow in FIG. 11) is received by the second light receiving portion 46e located on the light axis of the detection light. Thus, the medium P is not detected by the second light receiving portion 46e. Further, the detection light having been emitted from the light emitting portion 46c is not reflected because the medium P does not exist, and thus, reflected light is not received by the first light receiving portion 46d. Thus, the medium P is not detected by the first receiving portion 46d as well. Accordingly, since the medium P is not detected by both of the first receiving portion 46d and the second receiving portion 46e, the controller 30 does not receive the detection signal from the relevant fourth detection sensor 46, and thus determines that the relevant fourth detection sensor 46 does not detect the medium P.

Next, as shown in FIG. 12, when the medium P, as an example, plain paper, has been transported at the position where the relevant fourth detection sensor 46 is disposed on the medium transport path 26, the detection light having been emitted from the light emitting portion 46c is blocked by the medium P and thus is not received by the second light receiving portion 46e. As a result, the medium P is detected by the second light receiving portion 46e. On the other hand, the detection light having been emitted from the light emitting portion 46c is reflected by the medium P, and reflected light is detected by the first light receiving portion 46d. As a result, the medium P is also detected by the first receiving portion 46d. Since the medium P is detected by both of the first light receiving portion 46d and the second light receiving portion 46e, the controller 30 receives the detection signal from the relevant fourth detection sensor 46, and thus determines that the relevant fourth detection sensor 46 has detected the medium P.

Next, as shown in FIG. 13, when a medium P2, that is, for example, a medium whose first face side is subjected to black printing, has been transported at the position where the relevant fourth detection sensor 46 is disposed on the medium transport path 26, the detection light having been emitted from the light emitting portion 46c is blocked by the medium P2 and thus is not received by the second light receiving portion 46e. As a result, the medium P2 is detected by the second light receiving portion 46e. On the other hand, the detection light having been emitted from the light emitting portion 46c is not reflected at the surface of the medium P2, which is subjected to black printing, and thus, reflected light is not detected by the first light receiving portion 46d. As a result, the medium P2 is not detected by the first light receiving portion 46d. Here, since the medium P2 is detected by the second light receiving portion 46e, the controller 30 determines that the relevant fourth detection sensor 46 has detected the medium P2.

Next, as shown in FIG. 14, when a medium P3, as an example, a transparent medium (such as an OHP sheet), has been transported at the position where the relevant fourth detection sensor 46 is disposed on the medium transport path 26, part of the detection light having been emitted from the light emitting portion 46c is not blocked by the medium P3 but transmits through the medium P3, and thus is received by the second light receiving portion 46e. As a result, the medium P3 is not detected by the second light receiving portion 46e. On the other hand, for the detection light having been emitted from the light emitting portion 46c, part of the detection light is reflected at the surface of the medium P3, and thus, reflected light is detected by the first light receiving portion 46d. As a result, the medium P3 is detected by the first light receiving portion 46d. Here, since the medium P3 is detected by the first light receiving portion 46d, the controller 30 determines that the relevant fourth detection sensor 46 has detected the medium P3.

Here, when the relevant fourth detection sensor 46 is constituted by only the light emitting portion 46c and the first light receiving portion 46d, which is a reflection sensor, the medium P2, which is subjected to black printing, cannot be detected. Further, when the relevant fourth detection sensor 46 is constituted by only the light emitting portion 46c and the second light receiving portion 46e, which is a transparent sensor, the medium P3, which is transparent, cannot be detected. In the present practice example, the relevant fourth detection sensor 46 includes the light emitting portion 46c, the first light receiving portion 46d, which is a reflection sensor, and the second light receiving portion 46e, which is a transparent sensor, and the second light receiving portion 46e is disposed on the light axis of the detection light emitted from the light emitting portion 46c, and thus, the medium P2, which is subjected to black printing, and the medium P3, which is transparent, can be detected by such a set of sensors.

Further, if a detection sensor having a lever, such as the fifth detection sensor 50, is used, the detection of the medium P2, which is subjected to black printing, and the detection of the medium P3, which is transparent, could be detected, but a paper jam on the transport path could not be detected. On the other hand, a conventional reflection sensor or transparent sensor can detect the paper jam. The relevant fourth detection sensor 46 in the present practice example includes both of the configuration of the reflection sensor and the configuration of the transparent sensor, and thus, the paper jam can be detected by the relevant fourth detection sensor 46. Accordingly, the configuration of the relevant fourth detection sensor 46 enables characteristics that cannot be detected by each of the reflection sensor, the transparent sensor, and the sensor having a lever to be detected by one sensor, and thus, reduces the number of sensors disposed on the medium transport path 26, thereby enabling the cost reduction to be achieved.

Modification Example of Sensor

In the present practice example, the configuration in which the fourth detection sensor 46 includes the light emitting portion 46c, the first light receiving portion 46d, which is a reflection sensor, and the second light receiving portion 46e, which is a transparent sensor, has been employed, but a configuration in which at least one of the second detection sensor 42 and the fifth detection sensor 50 includes the light emitting portion 46c, the first light receiving portion 46d, which is a reflection sensor, and the second light receiving portion 46e, which is a transparent sensor, may be employed.

Summarizing the above description, the medium feeding apparatus 56 includes the medium mounting portion 16a for mounting the medium P; the feeding means 37 for feeding the medium P from the medium mounting portion 16a; the edge guides 22 for regulating medium width direction edges of the medium P, that is, apparatus width direction edges of the medium P, mounted on the medium mounting portion 16a, the medium width direction, that is, the apparatus width direction, being a direction intersecting with the medium feeding direction; and the fourth detection sensors 46 being for use in detecting the medium P and being disposed on the further downstream side than the edge guides 22 in the medium feeding direction and further outside than the guide faces 22a, which are edge regulation positions for the edge regulation by the edge guides 22, in the apparatus width direction, that is, the medium width direction.

According to the above configuration, the medium feeding apparatus 56 includes the fourth detection sensors 46 being for use in detecting the medium P and being disposed on the further downstream side than the edge guides 22 in the medium feeding direction and further outside than the guide faces 22a, which are edge regulation positions for the edge regulation by the edge guides 22, in the apparatus width direction, that is, the medium width direction, and thus, the medium feeding apparatus 56 is capable of directly detecting the medium P having been obliquely moved and having protruded to the outside from one of the guide faces 22a, which are edge regulation positions for the edge regulation by the edge guides 22.

With this configuration, the oblique movement of the medium P, which, when the feeding of the medium P is continued, is likely to cause a damage of an edge of the medium P or a lack of an image to be read, is detected with certainty, and consequently, the medium feeding apparatus 56 in which problems due to the oblique movement of the medium P being fed have been further taken into consideration is provided.

The pair of edge guides 22 and the pair of fourth detection sensors 46 are disposed so as to allow each of the edge guides 22 and each of the fourth detection sensors 46 to be associated with a corresponding one of both side edges of the medium P. According to this configuration, regardless of the direction of the oblique movement for the medium P, the detection of the medium P having protruded to the outside from one of the guide faces 22a, which are edge regulation positions for the edge regulation by the edge guides 22, is made with certainty.

The edge guides 22 are movable in the apparatus width direction, that is, the medium width direction, and the fourth detection sensors 46 are located further outside than the guide faces 22a, which are edge regulation positions for the edge regulation by the edge guides 22 and which are associated with a maximum size of the medium P in the apparatus width direction, that is, the medium width direction. According to this configuration, for the medium P whose size is maximum, that is, for a medium for which, when the medium is continuously fed while being obliquely moved, a damage of an edge of the medium is most likely to be caused, the detection of the medium P having protruded to the outside from one of the guide faces 22a, which are edge regulation positions for the edge regulation by the edge guides 22, is made with certainty, and consequently, the damage of the edge of the medium P is eliminated or minimized.

The edge guides 22 are movable in the apparatus width direction, that is, the medium width direction, and along a movement direction of the edge guides 22, the plurality of fourth detection sensors 46 are disposed at positions each associated with a corresponding one of a plurality of medium size standards. According to this configuration, for any medium having a size conforming to one of the plurality of medium size standards, the detection of the relevant medium having protruded to the outside from one of the guide faces 22a, which are edge regulation positions for the edge regulation by the edge guides 22, is made with certainty.

The edge guides 22 are movable in the apparatus width direction, that is, the medium width direction, and each of the fourth detection sensors 46 is disposed so as to be movable together with a corresponding one of the edge guides 22 in the apparatus width direction, that is, the medium width direction. According to this configuration, for any medium among media having various sizes, the detection of the relevant medium having protruded to the outside from one of the guide faces 22a, which are edge regulation positions for the edge regulation by the edge guides 22, is made with certainty.

The feeding guides 60 for regulating the medium width direction edges of the medium P being fed are disposed on the further downstream side than the edge guides 22 in the medium feeding direction and further outside than the guide faces 22a in the medium width direction; the notches 62 are each formed in a corresponding one of the feeding guides 60; and the fourth detection sensors 46 are each disposed inside a corresponding one of the notches 62. According to this configuration, for the medium P4 whose rigidity is relatively high, even though an oblique movement of the medium P4 is about to begin, the oblique movement is regulated by one of the feeding guides 60, and since the fourth detection sensors 46 are each disposed inside a corresponding one of the notches 62, the oblique movement is not detected by the any of fourth detection sensors 46, and consequently, the feeding of the medium P4 is appropriately continued.

Further, for the medium P5 whose rigidity is low, when an edge of the medium P5 is brought into contact with one of the feeding guides 60, the edge of the medium P5 is caused to bend at a contact portion, and the posture of the medium P is not changed. As a result, the edge of the medium P5 is inserted into a corresponding one of the notches 62 and is detected by a corresponding one of the fourth detection sensors 46. Thus, the detection of the medium P5 having protruded to the outside from a corresponding one of the guide faces 22a, which are edge regulation positions for the edge regulation by the edge guides 22, is appropriately made.

The feeding means 37 includes the feeding rollers 34 for feeding the medium P, and the separation rollers 36 each for separating the medium P by nipping the medium P with a corresponding one of the feeding rollers 34, and the notches 62 are disposed at places each including the nip position Y1 between the feeding rollers 34 and the separation rollers 36 in the medium feeding direction. According to this configuration, the notches 62, that is, the fourth detection sensors 46, are disposed near places (each including the nip position Y1 between the feeding rollers 34 and the separation rollers 36) at which factors of the occurrence of an oblique movement are likely to arise, and thus, the oblique movement is promptly and appropriately detected.

Each of the fourth detection sensors 46 includes the first facing portion 46a facing the first face of the medium P, and the second facing portion 46b facing the second face, that is, the opposite side face of the first face. The first facing portion 46a includes the light emitting portion 46c for emitting detection light toward the medium P, and the first light receiving portion 46d for receiving a reflected light element of the detection light having been emitted from the light emitting portion 46c, and the second facing portion 46b includes the second light receiving portion 46e for receiving the detection light having been emitted from the light emitting portion 46c.

According to the above configuration, the first facing portion 46a is configured to include the light emitting portion 46c for emitting detection light toward the medium P, and the first light receiving portion 46d for receiving a reflected light element of the detection light having been emitted from the light emitting portion 46c, and the second facing portion 46b is configured to include the second light receiving portion 46e for receiving the detection light having been emitted from the light emitting portion 46c. That is, the above configuration allows the single light emitting portion 46c to be utilized as the light emitting portion 46c common to the first light receiving portion 46d and the second light receiving portion 46e, and thus, both of the merit of the detection using a reflected-light receiving method and the merit of the detection using a transmitted-light receiving method are brought about, and simultaneously therewith, the cost reduction of the fourth detection sensors 46 is achieved.

The scanner 10 includes the image reading section 52 for reading the medium P, and the medium feeding apparatus 56 for feeding the medium P for the image reading section 52.

The controller 30 for controlling the feeding rollers 34 performs the first processing in response to the detection of the medium P by one of the fourth detection sensors 46. Further, the first processing is processing for stopping the feeding of the medium P by the feeding rollers 34. According to this configuration, the damage of an edge of the medium P is minimized or eliminated.

The fifth detection sensor 50 for detecting the passing of the anterior end PF of the medium P is disposed on the further downstream side than the fourth detection sensors 46 and on the further upstream side than the image reading section 52 in the medium feeding direction, and in the case where, after the detection of the medium P by one of the fourth detection sensors 46, the anterior end PF of the medium P has reached the image reading section 50 without having been detected by the fifth detection sensor 50, the controller 30 for controlling the image reading section 52 allows the image reading section 52 to start the reading of the medium P. According to this configuration, even when such significant skew that, because of an oblique movement of the medium P, causes part of the anterior end PF of the medium P to have already reached the image reading section 52 at the time the fifth detection sensor 50 detects the anterior end of the medium P has occurred, the lack of an image to be read is eliminated or minimized.

It should be noted that the invention is not limited to the aforementioned practice examples, and various modifications can be made within the scope of the invention set forth in appended claims. Obviously, such modifications are included in the scope of the invention.

What is claimed is:

1. An image reading apparatus comprising:
a medium mounting portion that is configured to mount a medium and disposed at a rear side of the image reading apparatus;
a feeding portion configured to feed the medium from the medium mounting portion;
a pair of edge guides configured to regulate side edges of the medium that is mounted on the medium mounting portion in a medium width direction, the medium width direction being a direction intersecting with a medium feeding direction;
a reading section that is configured to read the medium and disposed at a downstream side of the feeding portion in the medium feeding direction;
a pair of ejection rollers that is configured to eject the medium from a front side of the image reading apparatus and disposed at a downstream side of the reading section in the medium feeding direction;
medium detection sensors that are configured to detect the medium and include a first sensor and a second sensor, the first sensor being disposed at one side of a medium transport region in the medium width direction, the second sensor being disposed at the other side of the medium transport region in the medium width direction, the medium detection sensors being disposed between the feeding portion and the reading section in the medium feeding direction; and a controller configured to control a feeding of the medium and determine whether a skew of the medium occurs based on a detection of the medium detection sensors, wherein a distance between the first sensor and the second sensor is larger than a distance between guide faces of the edge guides in the medium width direction.

2. The image reading apparatus according to claim 1, wherein the distance between guide faces of the edge guides is associated with a width of a maximum size of the medium in the medium width direction.

3. The image reading apparatus according to claim 2, further comprising, a lower unit;

an upper unit that is attached to the lower unit so as to be pivotable relative to the lower unit about a pivot that is disposed at a downstream side of the lower unit in the medium feeding direction; and a cover that is attached to the lower unit so as to be pivotable relative to the lower unit, wherein the cover has the feeding portion and is configured to be pivotable between a first state in which the cover covers the upper unit and a second state in which the medium is mounted on the feeding portion forms, and wherein the distance between guide faces of the edge guides is associated with a width of a maximum size of the medium in the medium width direction.

4. The image reading apparatus according to claim 1, further comprising, a pair of the transport rollers that transports the medium to the reading section and disposed between the feeding portion and the reading section in the medium feeding direction, wherein the medium detection sensors are disposed between the feeding portion and the pair of the transport rollers in the medium feeding direction.

5. The image reading apparatus according to claim 4, further comprising, a multi-feeding detection sensor that detects a multi-feeding of the medium and disposed between the feeding portion and the pair of the transport rollers in the medium feeding direction.

6. The image reading apparatus according to claim 5, wherein the medium detection sensors are disposed between the multi-feeding detection sensor and the pair of the transport rollers in the medium feeding direction.

7. The image reading apparatus according to claim 6, further comprising, an anterior end detection sensor that is configured to detect an anterior end of the medium and disposed between the pair of the transport rollers and the reading section in the medium feeding means, wherein the controller controls a reading of the medium and determine to start the reading based on a detection of the anterior end detection sensor.

8. The image reading apparatus according to claim 7, wherein when the anterior end detection sensor detects the anterior end of the medium and the medium detection sensors do not detect the medium, the controller starts the reading.

9. The image reading apparatus according to claim 6, further comprising, a lower unit; and an upper unit that is attached to the lower unit so as to be pivotable relative to the lower unit about a pivot that is disposed at a downstream side of the lower unit in the medium feeding direction.

10. The image reading apparatus according to claim 6, further comprising, a lower unit;

an upper unit that is attached to the lower unit so as to be pivotable relative to the lower unit about a pivot that is disposed at a downstream side of the lower unit in the medium feeding direction; and a cover that is attached to the lower unit so as to be pivotable relative to the lower unit, wherein the cover has the feeding portion and is configured to be pivotable between a first state in which the cover covers the upper unit and a second state in which the medium is mounted on the feeding portion forms, and wherein the distance between guide faces of the edge guides is associated with a width of a maximum size of the medium in the medium width direction.

11. The image reading apparatus according to claim 1, wherein the feeding portion includes a feeding roller and a separation roller that separates the medium by nipping the medium with the feeding roller, and wherein the medium detection sensors are disposed at a place overlapping with a nip position of the feeding roller and the separation roller in the medium width direction.

12. The image reading apparatus according to claim 11, further comprising, two feeding guides that are configured to regulate the medium fed by the feeding portion and disposed at the both sides of the medium transport region in the medium width direction, each of the two feeding guides having a notch, wherein each of the first sensor and the second sensor is disposed at the notch.

13. The image reading apparatus according to claim 1, further comprising, a wall portion that are configured to regulate the medium fed by the feeding portion and disposed at an upstream side of each of the medium detection sensors in the medium feeding direction.

14. The image reading apparatus according to claim 1, wherein when the controller determines that the skew occurs, the controller stops the feeding.

15. The image reading apparatus according to claim 1, further comprising, an anterior end detection sensor that is configured to detect an anterior end of the medium and disposed between the medium detection sensors and the reading section in the medium feeding direction, wherein the controller controls a reading of the medium and determine to start the reading based on a detection of the anterior end detection sensor.

16. The image reading apparatus according to claim 15, wherein when the anterior end detection sensor detects the anterior end of the medium and the medium detection sensors do not detect the medium, the controller starts the reading.

17. The image reading apparatus according to claim 1, further comprising,
a lower unit; and
an upper unit that is attached to the lower unit so as to be pivotable relative to the lower unit about a pivot that is disposed at a downstream side of the lower unit in the medium feeding direction.

* * * * *